United States Patent
Tokunaga et al.

(10) Patent No.: US 6,961,331 B2
(45) Date of Patent: Nov. 1, 2005

(54) IP GATEWAY APPARATUS

(75) Inventors: Seiji Tokunaga, Fukuoka (JP); Hiromitsu Kajiyama, Fukuoka (JP); Masahiko Nagafuji, Fukuoka (JP); Kenji Yamada, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 780 days.

(21) Appl. No.: 09/799,546

(22) Filed: Mar. 5, 2001

(65) Prior Publication Data

US 2002/0027923 A1    Mar. 7, 2002

(30) Foreign Application Priority Data

Aug. 24, 2000  (JP) .............................. 2000-254336

(51) Int. Cl.[7] .............................................. H04L 12/66
(52) U.S. Cl. ...................... 370/352; 370/353; 370/356; 370/412; 370/401
(58) Field of Search ............................... 370/352, 353, 370/356, 516, 517, 401, 412

(56) References Cited

U.S. PATENT DOCUMENTS

| | | | |
|---|---|---|---|
| 4,009,336 A | * | 2/1977 | Saliga ......................... 370/522 |
| 6,269,095 B1 | * | 7/2001 | Neubauer et al. ........... 370/352 |
| 6,360,271 B1 | * | 3/2002 | Schuster et al. ............. 709/231 |
| 2003/0227907 A1 | * | 12/2003 | Choi et al. ................... 370/352 |
| 2004/0032860 A1 | * | 2/2004 | Mundra et al. .............. 370/352 |
| 2005/0094628 A1 | * | 5/2005 | Ngamwongwattana et al. .. 370/352 |

FOREIGN PATENT DOCUMENTS

JP    200004259    1/2000

* cited by examiner

*Primary Examiner*—Ricky Ngo
*Assistant Examiner*—Feben Haile
(74) *Attorney, Agent, or Firm*—Katten Muchin Rosenman LLP

(57) ABSTRACT

In an IP (Internet Protocol) gateway apparatus for storing a plurality of channels, voice signals supplied from the respective channels are packeted, and then the voice packets are sent out to an IP network. The IP gateway apparatus is provided with a synchronization timing generating apparatus for outputting a synchronization signal indicative of timing at which the voice signals of the respective channels are packeted, and a packeting apparatus for packeting the voice signals supplied from the respective channels in accordance with the synchronization signal outputted from the synchronization timing generating apparatus to thereby send out the voice packets to the IP network.

6 Claims, 16 Drawing Sheets

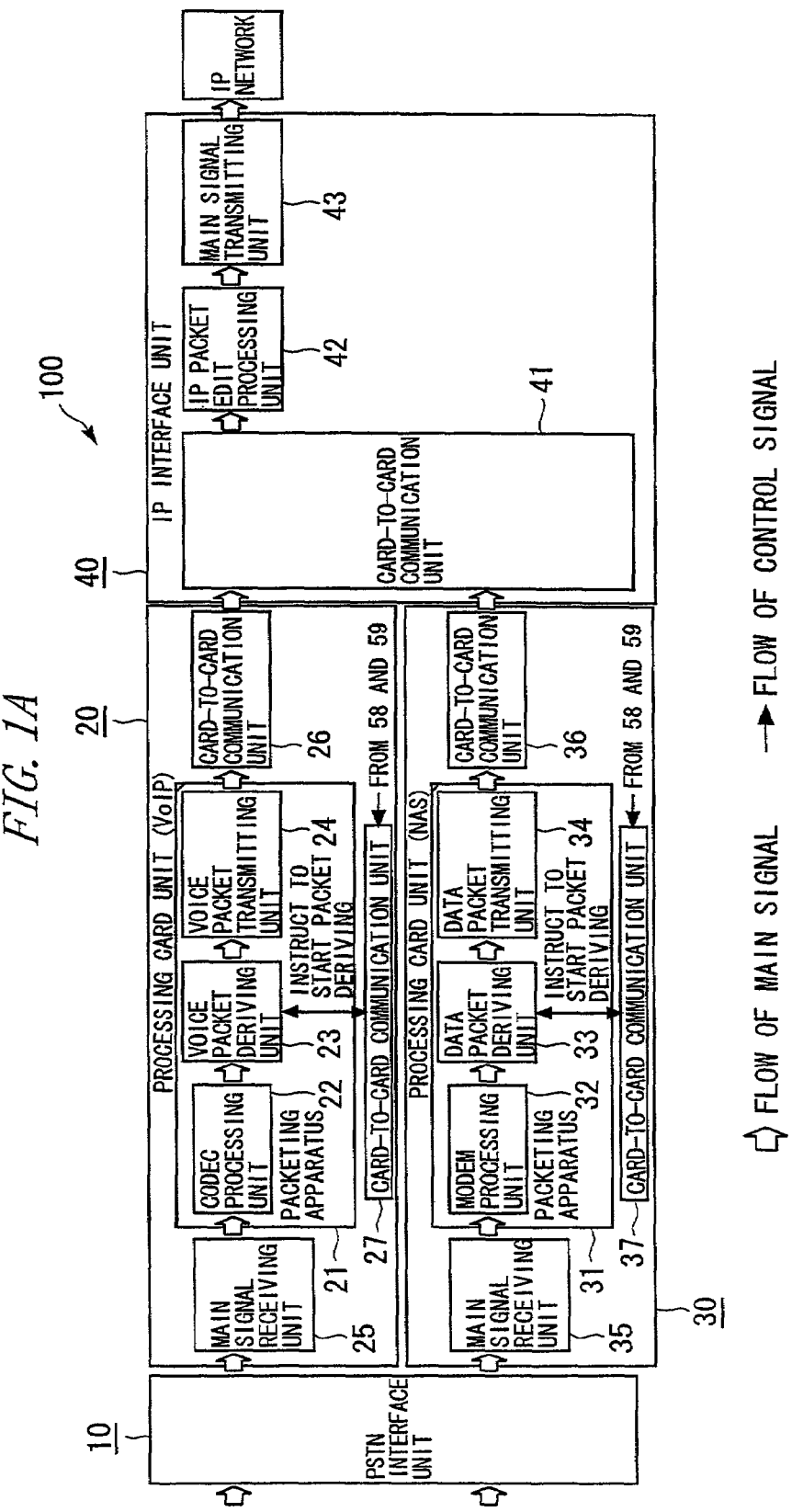

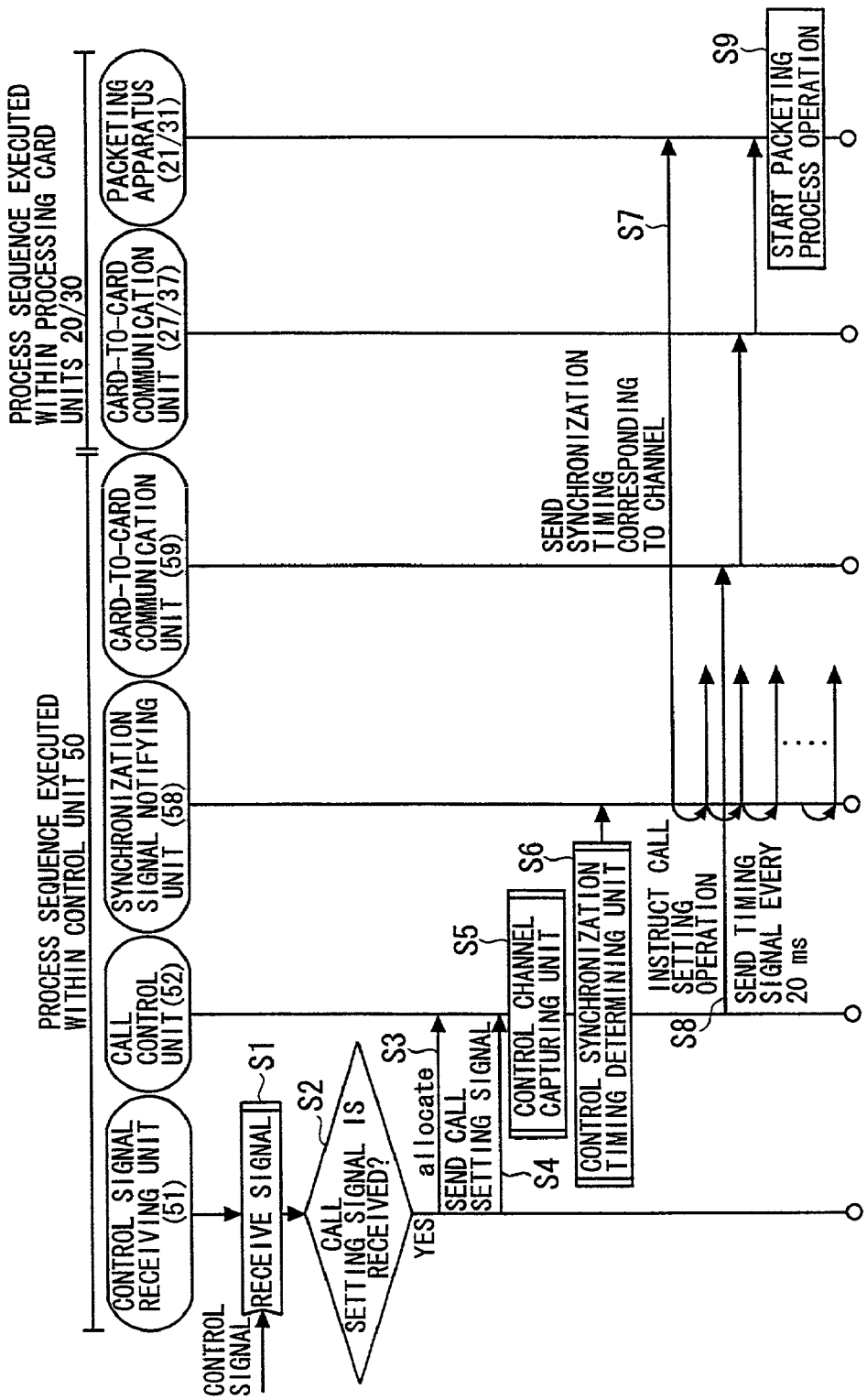

FIG. 9A

TIMING MANAGING DATA (BEFORE CAPTURED)

▨ : UNDER USE  ☐ : NON-USE

|  SYNC→ ENB↓ | 1 | 2 | 3 | 4 | ... | m | m+1 | m+2 | m+3 | m+4 | m+5 | m+6 | m+7 |
|---|---|---|---|---|---|---|---|---|---|---|---|---|---|
| 1 | A | B |   | D | .... |   |   |   |   |   |   |   |   |
| 2 | A |   |   |   | .... |   |   |   |   |   |   |   |   |
| 3 | A | B |   | D | .... |   |   |   |   |   |   |   |   |
| 4 | A |   |   |   | .... |   |   |   |   |   |   |   |   |
| 5 | A | B |   | D | .... |   |   |   |   |   |   |   |   |
| 6 | A |   |   |   | .... |   |   |   |   |   |   |   |   |

FIG. 9B

TIMING MANAGING DATA (AFTER CAPTURED)

|  SYNC→ ENB↓ | 1 | 2 | 3 | 4 | ... | m | m+1 | m+2 | m+3 | m+4 | m+5 | m+6 | m+7 |
|---|---|---|---|---|---|---|---|---|---|---|---|---|---|
| 1 | A | B | C | D | .... |   |   |   |   |   |   |   |   |
| 2 | A |   |   |   | .... |   |   |   |   |   |   |   |   |
| 3 | A | B | C | D | .... |   |   |   |   |   |   |   |   |
| 4 | A |   |   |   | .... |   |   |   |   |   |   |   |   |
| 5 | A | B | C | D | .... |   |   |   |   |   |   |   |   |
| 6 | A |   |   |   | .... |   |   |   |   |   |   |   |   |

FIG. 9C

TIMING PRODUCING DATA

| CH | OFFSET VALUE (SYNC-x) | TIME PERIOD VALUE |
|---|---|---|
| 1 | SYNC-1 | 20ms (non-enable) |
| 2 | SYNC-4 | 20ms (2a-ENB) |
| 3 | NON-USE | NON-USE |
| ⋮ | ⋮ | ⋮ |
| 10 | SYNC-3 | 20ms (2a-ENB) |
| ⋮ | ⋮ | ⋮ |
| n-1 | SYNC-2 | 20ms (2a-ENB) |
| n | NON-USE | NON-USE |

FIG. 10A

TIMING MANAGING DATA (BEFORE CAPTURED)  ▨ :UNDER USE  ☐ :NON-USE

| SYNC-<br>ENB- | 1 | 2 | 3 | 4 | ... | m | m+1 | m+2 | m+3 | m+4 | m+5 | m+6 | m+7 |
|---|---|---|---|---|---|---|---|---|---|---|---|---|---|
| 1 | A | B |   | D | .... |   |   |   |   |   |   |   |   |
| 2 | A |   |   |   | .... |   |   |   |   |   |   |   |   |
| 3 | A | B |   |   | .... |   |   |   |   |   |   |   |   |
| 4 | A |   |   | D | .... |   |   |   |   |   |   |   |   |
| 5 | A | B |   |   | .... |   |   |   |   |   |   |   |   |
| 6 | A |   |   |   | .... |   |   |   |   |   |   |   |   |

TIMING MANAGING DATA (AFTER CAPTURED)

| SYNC-<br>ENB- | 1 | 2 | 3 | 4 | ... | m | m+1 | m+2 | m+3 | m+4 | m+5 | m+6 | m+7 |
|---|---|---|---|---|---|---|---|---|---|---|---|---|---|
| 1 | A | B |   | D | .... |   |   |   |   |   |   |   |   |
| 2 | A |   |   |   | .... | ▨ | ▨ | ▨ | ▨ | ▨ | ▨ | ▨ | ▨ |
| 3 | A | B |   |   | .... |   |   |   |   |   |   |   |   |
| 4 | A |   |   | D | .... |   |   |   |   |   |   |   |   |
| 5 | A | B |   |   | .... |   |   |   |   |   |   |   |   |
| 6 | A |   |   |   | .... |   |   |   |   |   |   |   |   |

TIMING PRODUCING DATA

| CH | OFFSET VALUE (SYNC-x) | TIME PERIOD VALUE |
|---|---|---|
| 1 | SYNC-1 | 10ms (non-enable) |
| 2 | SYNC-4 | 30ms (3a-ENB) |
| 3 | NON-USE | NON-USE |
| 3 | NON-USE | NON-USE |
| 10 | SYNC-m | 60ms (2a-ENB+3b-ENB) |
| ⋮ | ⋮ | ⋮ |
| n-1 | SYNC-2 | 20ms (2a-ENB) |
| n | NON-USE | NON-USE |

|ENB\SYNC-|1|2|3|4|...|m-7|...|m-3|m-2|m-1|m|m+1|...|m+7|
|---|---|---|---|---|---|---|---|---|---|---|---|---|---|---|
|1|A|B|C|D|...| |...| | | | | |...| |
|2|A|B| |D|...|F|...| |F|F|F|F|...| |
|3|A|B|C| |...| |...|F|F|F| | |...|F|
|4|A| | | |...| |...| | | | | |...| |
|5|A|B| |D|...| |...| | | | | |...| |
|6|A| | | |...| |...| | | | | |...| |

▨ : UNDER USE
☐ : NON-USE

← 60 CHANGE OF FRAGMENT LENGTH

| CH | OFFSET VALUE (SYNC-x) | TIME PERIOD VALUE |
|---|---|---|
| 1 | SYNC-1 | 10ms (non-enable) |
| 2 | SYNC-4 | 30ms (3a-ENB) |
| 3 | NON-USE | NON-USE |
| 3 | NON-USE | NON-USE |
| 10 | SYNC-m | 60ms (2a-ENB+3b-ENB) |
| ... | ... | ... |
| n-1 | SYNC-2 | 20ms (2a-ENB) |
| n | NON-USE | NON-USE |

⇑

566

| CH | OFFSET VALUE (SYNC-x) | TIME PERIOD VALUE |
|---|---|---|
| 1 | SYNC-1 | 10ms (non-enable) |
| 2 | SYNC-4 | 30ms (3a-ENB) |
| 3 | NON-USE | NON-USE |
| 3 | NON-USE | NON-USE |
| 10 | SYNC-m | 60ms (2a-ENB+3b-ENB) |
| ... | ... | ... |
| n-1 | SYNC-2 | 20ms (2a-ENB) |
| n | NON-USE | NON-USE |

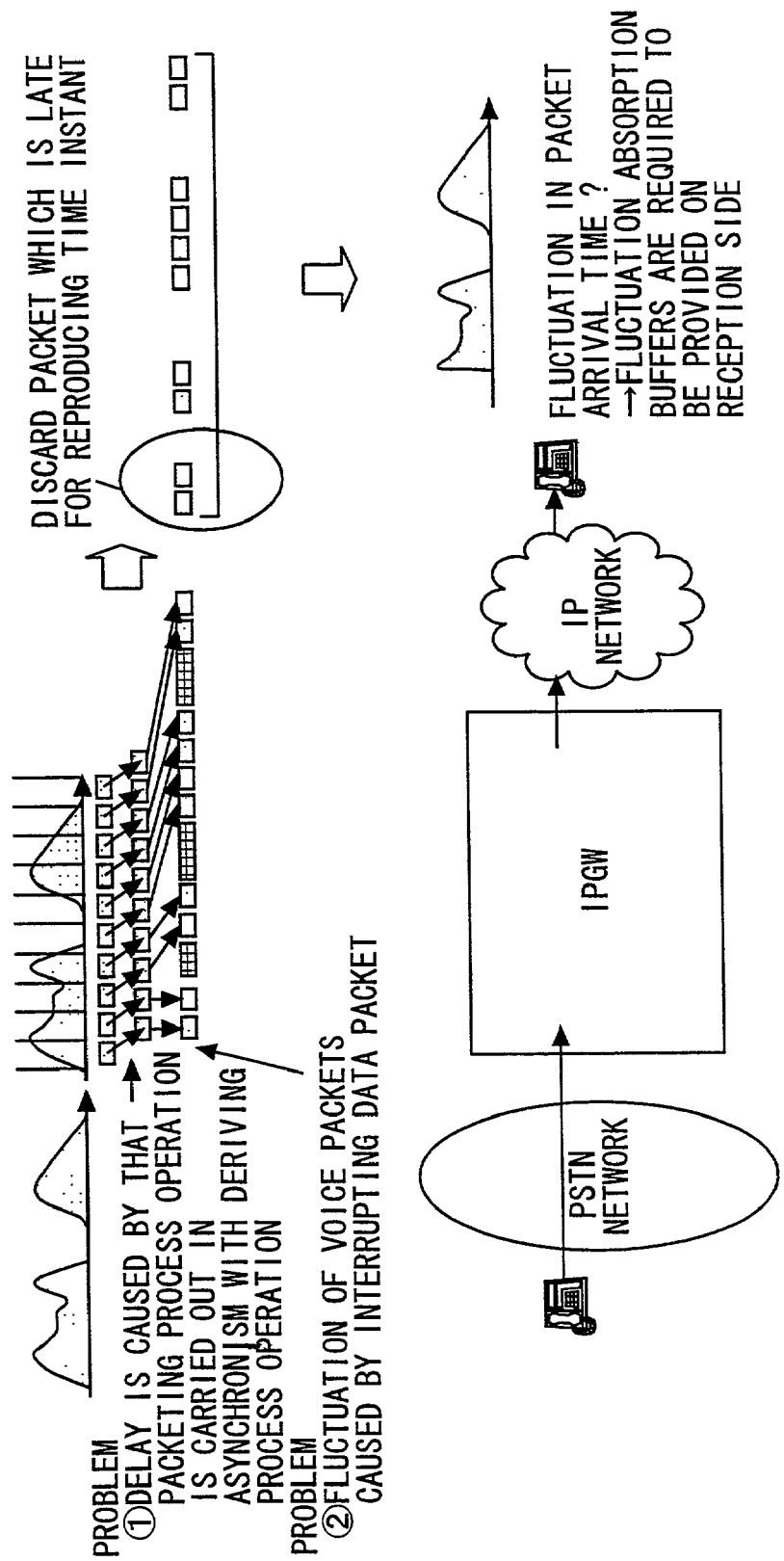

IP GATEWAY APPARATUS

BACKGROUND OF THE INVENTION

1. Field of the Invention

The present invention generally relates to an IP gateway apparatus. More specifically, the present invention is directed to a technique capable of securing qualities of voice packets, namely, capable of securing strictly high qualities required for delay time in IP gateway apparatuses capable of packeting voice data to send out voice data packets to IP networks.

2. Description of the Related Art

In VoIP (Voice over IP) services, improvements in voice qualities are required. That is, noise, fluctuations, and voice drops are wanted to be avoided. In the conventional techniques, voice packets are processed with priority over packets of other media (e.g., data), so that delays in voice packet arriving time can be avoided.

As a technique of a packet quality control method, Japanese Patent Application Laid-open No. Hei 4-306031 discloses "PACKET QUALITY CONTROL METHOD." In this control technique, the packets are classified based upon a plurality of quality classes in accordance with the allowable delay time and the allowable discard rate. While the threshold values of the traffics within the system are set with respect to these quality classes, a quality control is carried out in such a manner that when the packets exceed the relevant threshold value, the priority order for transmitting the packets is determined based upon the quality classes.

In the above-explained conventional technique, while either the threshold value of the traffic within the system or the length of the line sending queue is compared with the threshold values of the respective quality classes, the priority order of the packet transmission is controlled. Otherwise, the packets are selectively discarded. In the conventional technique, the priority order in the case that the packeted PCM (pulse code modulation) signals are transmitted to the IP network is merely controlled in order to guarantee the qualities. However, this conventional packet quality control method does not solve the problem of delays occurred in the packeting process operation per se. As a result, in the above-explained prior art technique, there are possibilities that the delays occur in the packet processing operation within the system. In other words, deteriorations eventually occur in the delay time qualities, and therefore, the voice qualities are not secured.

FIG. 14 shows a structural diagram of a conventional IP gateway apparatus. FIG. 15 is an explanatory diagram for explaining a problem of the conventional IP gateway apparatus. In FIG. 14, both a CODEC processing unit and a MODEM processing unit packet a PCM signal received by a PSTN interface unit to produce either a voice packet (sound packet) or a data packet. Both a voice packet deriving unit and a data packet deriving unit derive either the voice packet or the data packet outputted from either the CODEC processing unit or the MODEM processing unit in response to a packet deriving instruction issued from a control unit.

In the conventional IP gateway apparatus, the following operations may constitute factors for packet processing delays. That is, while the CODEC processing unit executes the packeting process operations for the plural channels in the parallel manner, this CODEC processing unit outputs the data packets of the plural channels at the timing which is under asynchronous condition. Furthermore, when a packet is transmitted to the IP network, either the voice packet deriving unit or the data packet deriving unit derives this packet from either the CODEC processing unit or the MODEM processing unit by way of the polling process operation. In this case, the time period of this polling process operation is not synchronized with the output timing of the packet. In other words, the packeting process operation is carried out in asynchronism with the packet deriving process operation. As a consequence, as to a certain voice, there is such a possibility that a maximum delay is produced which is equal to the time period of the packeting process operation (see problem No. 1 shown in FIG. 15). Assuming now that even if such an arrangement is employed in which the CPU (Central Processing Unit) executes the IP packeting process operation by an interruption made by the DSP (Data Signal Processor), since the interruption made by the DSP is uncertain, the interruption process operations are concentrated within a given time duration. Otherwise, there is an overhead required to perform the interruption process operations. As a result, there is such a chance that the delays are produced in the real-time processing operation (see problem No. 1 shown in FIG. 15).

Furthermore, in the IP gateway apparatus, not only voice calls, but also data calls are mixed with each other. When the voice packets are sent out to the IP network, since the data packets are interrupted among the voice packets, there may be fluctuation of voice packets (see problem No. 2 indicated in FIG. 15).

The ITU G.114 recommendation requests that the delay time should be suppressed within 150 milliseconds. While the above-explained process delays and fluctuations may give large adverse influences to the voice qualities, if the delays and the fluctuations are increased, then the end users must listen to voices (sound) having deteriorated qualities. To avoid this problem, on the reception side of the voice packets, both the delays and the fluctuations are tried to be solved by increasing the fluctuation absorbing buffers. However, even when the fluctuation absorption buffer is increased, the problems of both the delays and the fluctuations cannot be solved, and therefore, the delayed packets should be discarded. In this case, the qualities of the voice could not be maintained at the desirable levels. As a consequence, the following requests are made on the packet transmission side. That is, the delays produced in the packet transmission process operation are to be shortened, and also the fluctuations are to be prevented.

SUMMARY OF THE INVENTION

An object of the present invention is to provide an IP gateway apparatus capable of preventing a delay occurred in a voice packet transmission.

Another object of the present invention is to provide such an IP gateway apparatus capable of avoiding an occurrence of a fluctuation in a voice packet by executing a process operation related to a data packet.

To achieve the above-described objects, an IP gateway apparatus according to an aspect of the present invention may be accomplished by employing the below-mentioned arrangement. That is, an IP gateway apparatus accommodating a plurality of channels including at least first and second channels, comprising: first means for outputting synchronization signals, the synchronization signals indicating first timing for generating packets comprising sound received from the first channel and second timing for generating packets comprising sound received from the second channel; and second means for receiving the synchronization signals, and respectively generating the packets corresponding to the first and second channels according to the first and second timing in order to transmit the generated packets to the IP network.

BRIEF DESCRIPTION OF THE DRAWINGS

A better understanding of the present invention may be made by reading a detailed description with reference to the accompanying drawings, in which:

FIG. 5 is a sequential operation diagram for representing a call connection processing operation (call setting process operation);

FIG. 9 is an explanatory diagram for explaining a concrete example of the embodiment;

FIG. 10 is an explanatory diagram for explaining another concrete example of the embodiment;

FIG. 12 is an explanatory diagram for explaining another process operation of the fragment length managing unit;

FIG. 15 is an explanatory diagram for explaining the problems of the conventional IP gateway apparatus.

DESCRIPTION OF THE PREFERRED EMBODIMENTS

Referring now to drawings, various preferred embodiments of the present invention will be described in detail. It should be understood that the below-mentioned embodiments are simply exemplified, and therefore, the present invention is not limited thereto.

[Arrangement of IP Gateway Apparatus]

Figure 1B:
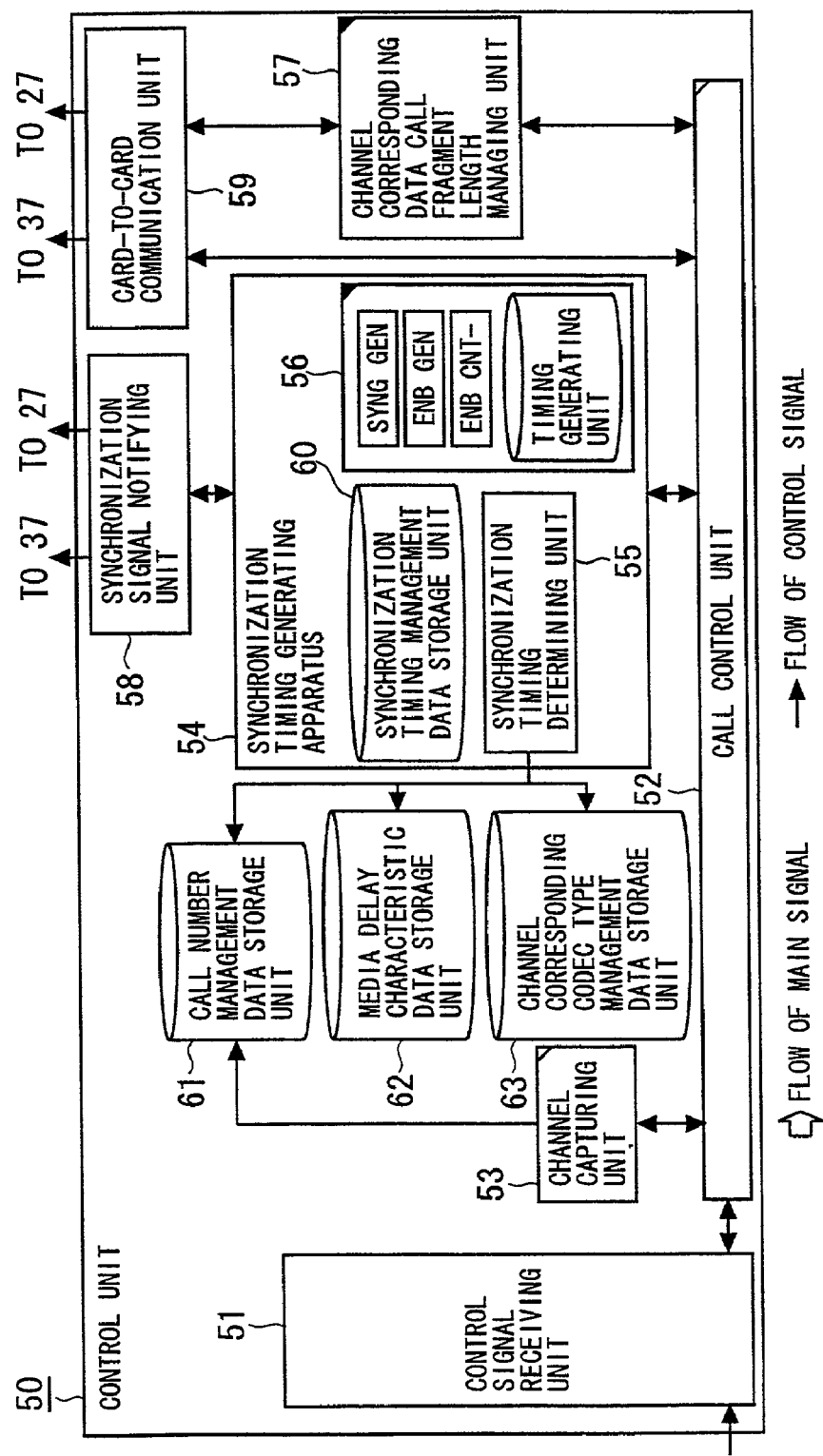
FIG. 1 is a schematic block diagram for showing an arrangement of an IP gateway apparatus according to an embodiment of the present invention.

FIG. 1 is a functional block diagram for showing an arrangement of an IP (Internet Protocol) gateway apparatus 100 according to an embodiment of the present invention. The IP gateway apparatus 100 is arranged by a PSTN (Public Switched Telephone Network) 10, a processing card unit 20 (hereinafter will be referred to as a "card 20"), another processing card unit 30 (hereinafter will be referred to as a "card 30"), an IP interface unit 40, and a control unit 50.

It should be noted that as to these cards 20 and 30, only one of each card is illustrated in FIG. 1. However, as to each of the cards 20 and 30, an arbitrarily selected number of cards may be provided within a range of channels which may be stored in the IP gateway apparatus 100.

<PSTN Interface Unit>

The PSTN interface unit 10 interfaces with a PSTN (Public Switched Telephone Network), and transmits/receives a PCM signal (voice data, or speech data).

<Card 20>

The card 20 corresponds to a processing card used for a VoIP (Voice over IP). At least one channel among plural channels (lines) stored in the IP gateway apparatus 100 is allocated to the card 20. The card 20 receives a PCM signal from the PSTN interface unit 10 via the channel allocated to the own card 20 (namely, channel being stored by own card), and then produces a voice packet (speech packet) from the received PCM signal. Also, the card 20 may execute a process operation with respect to a layer 3 (Internet layer) of the produced voice packet.

The card 20 is equipped with a packeting apparatus 21, a main signal receiving unit 25, a card-to-card communication unit 26, and another card-to-card communication unit 27. The packeting apparatus 21 contains a CODEC processing unit 22, a voice packet deriving unit 23, and a voice packet transmitting unit 24. This packeting apparatus 21 is arranged by employing, for example, a DSP (Digital Signal Processor).

The main signal receiving unit 25 receives a PCM signal corresponding to a channel stored in the card 20 from the PSTN interface unit 10, and then, inputs the received PCM signal to the CODEC processing unit 22 of the packeting apparatus 21.

The CODEC processing unit 22 owns CODECs (not shown) corresponding to the respective channels stored in the card 20, and buffers (not shown) corresponding to the respective CODECs. Each of these CODECs encodes the PCM signal inputted from the main signal receiving unit 25 in accordance with a predetermined CODEC type (CODEC rule). As a result, the PCM signal is converted into a voice packet. The respective buffers temporarily store therein voice packets produced by the corresponding CODECs. In this example, as the CODEC type, 10 milliseconds (ms), 20 milliseconds, and 30 milliseconds are prepared, which indicate a time period of a CODEC processing operation.

The voice packet deriving unit 23 derives the voice packets temporarily stored in the respective buffers of the CODEC processing unit 22 in response to a synchronization signal (synchronization timing) which is applied from the communication unit 27 as a packet deriving commencement instruction, and then supplies the derived voice packet to the voice packet transmitting unit 24.

The voice packet transmitting unit 24 adds a header of a layer 3 (namely, network layer of OSI) to a voice packet supplied from the voice packet deriving unit 23, and thereafter, supplies the resulting voice packet to a communication unit 26.

The communication unit 26 may function as a communication unit with the IP interface unit 40. The communication unit 26 supplies a voice packet received from the voice packet transmitting unit 24 to the IP interface unit 40.

The communication unit 27 may function as a communication unit with the control unit 50. The communication unit 27 supplies the synchronization signal (synchronization timing) sent out from the control unit 50 as a packet deriving commencement instruction to the voice packet deriving unit 23.

<Card 30>

The card 30 corresponds to a processing card used for a NAS (Network Access Server), and stores at least one of plural channels (lines) which are stored in the IP gateway apparatus 100. The card 30 terminates a PCM signal (MODEM signal) which is received by the PSTN interface unit 10, and produces a data packet corresponding to the PCM signal, and thereafter sends out the produced data packet to the IP network. Also, the card 30 executes a process operation with respect to the layer 3 of the produced data packet.

The card 30 is equipped with a packeting apparatus 31, a main signal receiving unit 35, a card-to-card communication unit 36, and another card-to-card communication unit 37. The packeting apparatus 31 contains a MODEM processing unit 32, a data packet deriving unit 33, and a data packet transmitting unit 34. The main signal receiving unit 35 receives a PCM signal of data from the PSTN interface unit 10. The card-to-card communication unit 36 may function as a communication unit with the IP interface unit 40. The card-to-card communication unit 37 may function as a communication unit with the control unit 50. The packeting apparatus 31 is arranged by employing, for example, a DSP.

The main signal receiving unit 35 receives a PCM signal corresponding to a channel stored in the card 30 from the PSTN interface unit 10, and then, inputs the received PCM signal to the MODEM processing unit 32 of the packeting apparatus 31.

The MODEM processing unit 32 converts a PCM signal entered from the main signal receiving unit 35 in accordance with a predetermined condition into a data packet, and causes a buffer (not shown) to temporarily store therein the converted data packet.

The data packet deriving unit 33 derives the data packets temporarily stored in the respective buffers (not shown) of the MODEM processing unit 32 in response to a synchronization signal (synchronization timing) which is applied from the communication unit 37 as a packet deriving commencement instruction, and then supplies the derived data packet to the data packet transmitting unit 34.

The data packet transmitting unit 34 adds a header of a layer 3 to a data packet supplied from the data packet deriving unit 33, and thereafter, supplies the resulting data packet to a communication unit 36.

The communication unit 36 may function as a communication unit with the IP interface unit 40. The communication unit 36 supplies a voice packet received from the data packet transmitting unit 34 to the IP interface unit 40.

The communication unit 37 may function as a communication unit with the control unit 50. The communication unit 37 supplies the synchronization signal (synchronization timing) sent out from the control unit 50 as a packet deriving commencement instruction to the data packet deriving unit 33.

<IP Interface Unit>

The IP interface unit 40 transmits/receives an IP packet, and executes a process operation with respect to a layer 2 (namely, data link layer of OSI) of a packet. The IP interface unit 40 contains a card-to-card communication unit 41, an IP packet edit processing unit 42, and a main signal transmitting unit 43. The card-to-card communication unit 41 may function as a communication unit with the respective cards 20 and 30. The IP packet edit processing unit 42 adds a header of the layer 2 to an IP packet (either voice packet or data packet) received by the communication unit 41. The main signal transmitting unit 43 transmits the IP packet which is processed by the edit processing unit 42 to an external device (not shown).

<Control Unit>

The control unit 50 controls an overall arrangement of the IP gate way apparatus 100. The control unit 50 is provided with a control signal receiving unit 51, a call control unit 52, a channel capturing unit 53, and a synchronization timing generating apparatus 54. The synchronization timing generating apparatus 54 generates variable synchronization timing with respect to the respective channels stored in the IP gateway.

The synchronization timing generating apparatus 54 includes a synchronization timing determining unit 55, a timing generating unit 56, and a synchronization timing management data storage unit 60. The synchronization timing determining unit 55 determines synchronization timing with respect to each channel. The timing generating unit 56 generates a synchronization signal (synchronization timing) which should be applied to the respective packeting apparatuses 21 and 31 in response to the synchronization timing determined by the synchronization timing determining unit 55.

Also, the control unit 50 is provided with a channel corresponding data call fragment length managing unit 57 (hereinafter will be simply referred to as a "fragment length managing unit 57"), a synchronization signal notifying unit 58, and a card-to-card communication unit 59. The fragment length managing unit 57 adjusts a fragment size of a data packet based upon information such as a call amount within the IP gateway apparatus 100. The synchronization signal notifying unit 58 notifies a synchronization signal (timing signal) to the respective cards 20 and 30. The card-to-card communication unit 59 may function as a communication unit with the respective cards 20 and 30.

The control unit 50 is further equipped with a call number management data storage unit 61, a media delay characteristic data storage unit 62, and a channel corresponding CODEC type management data storage unit 63 (hereinafter will be simply referred to as a "CODEC type management data storage unit" 63). The call number management data storage unit 61 is used in order to determine the synchronization timing with respect to each channel.

<Timing Generating Unit>

Figure 2:
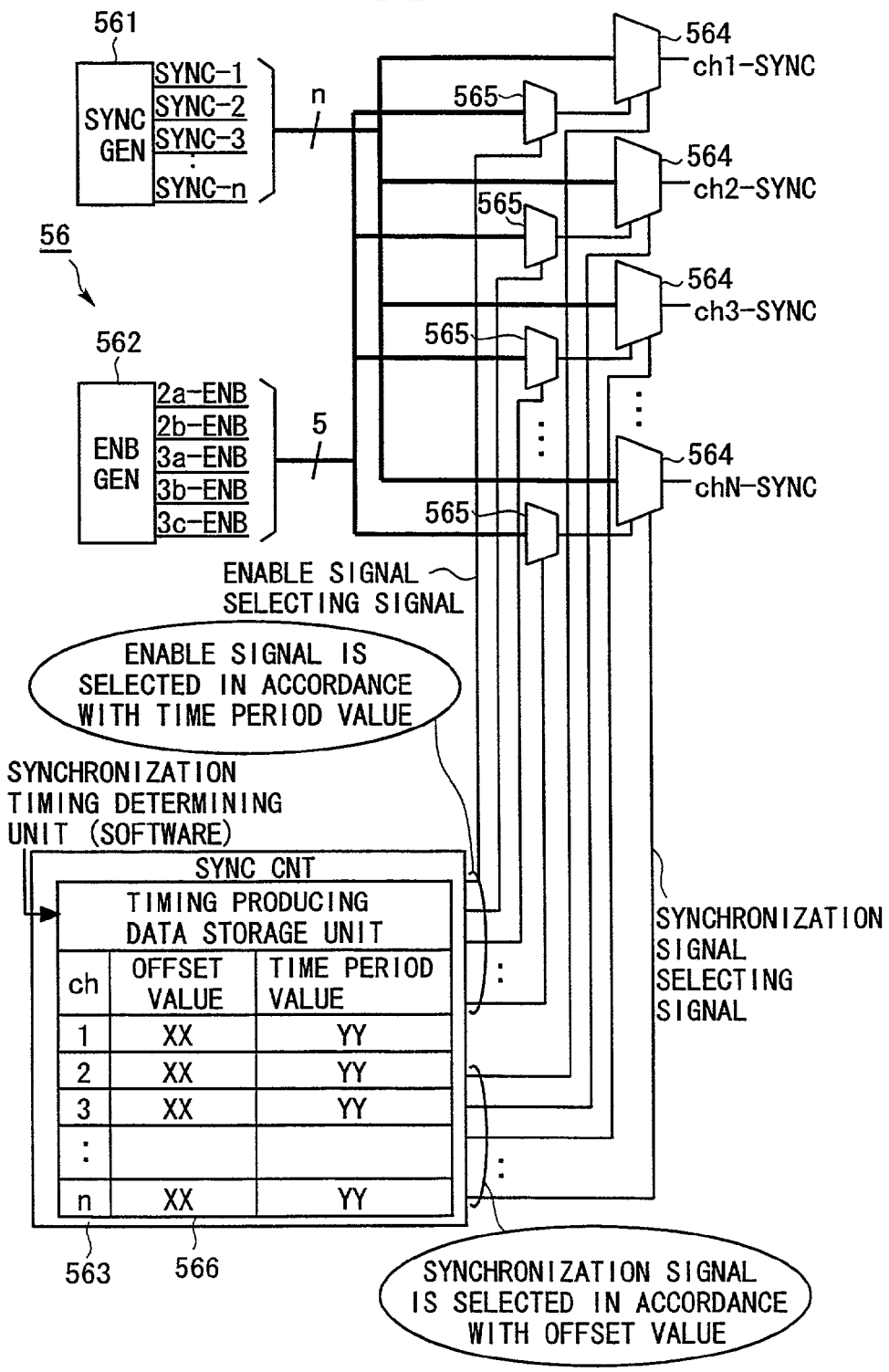
FIG. 2 is a schematic block diagram for indicating an arrangement of a synchronization timing generating apparatus.
Figure 3:
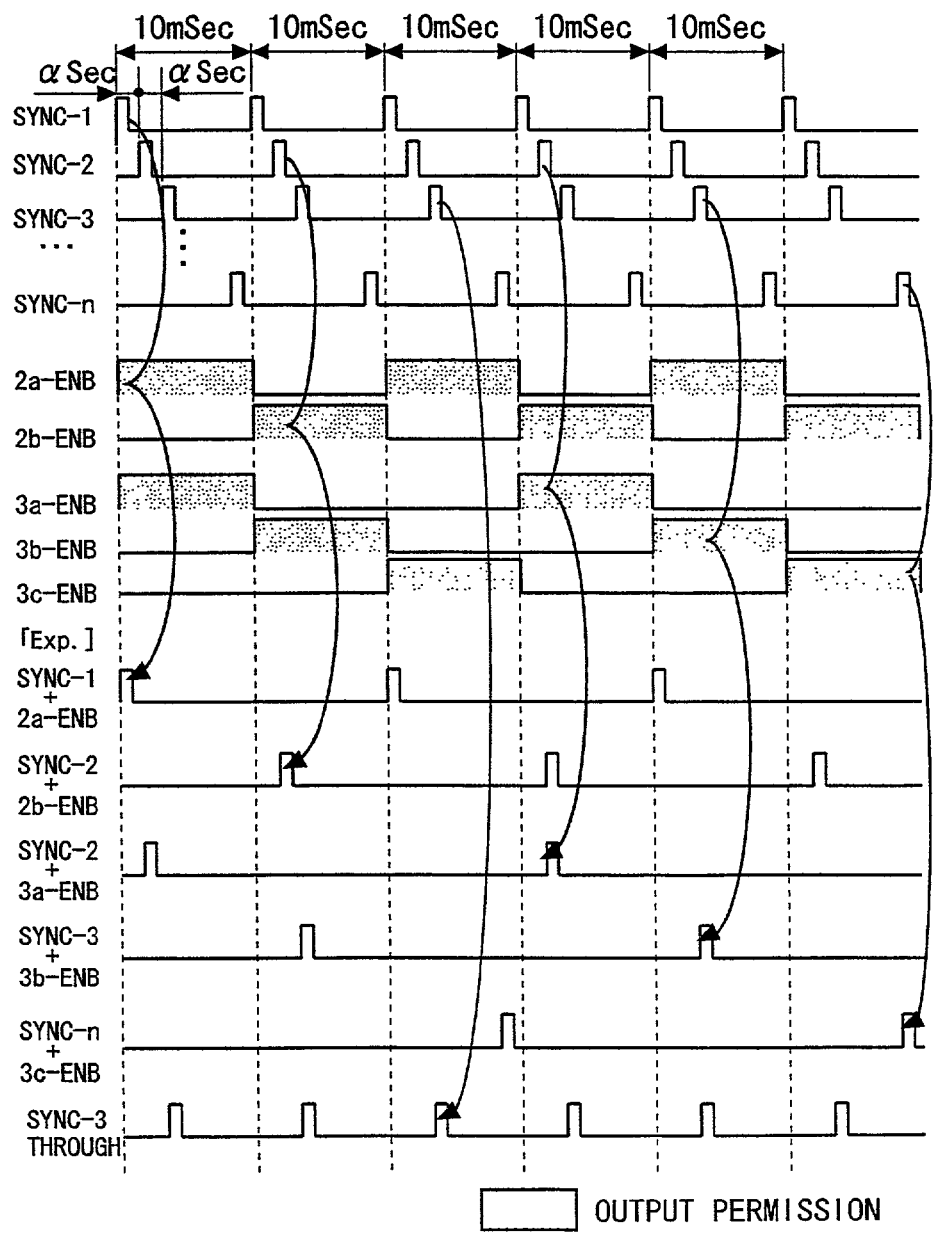
FIG. 3 is an explanatory diagram for explaining the synchronization timing.

FIG. 2 schematically shows a hardware structural diagram of the timing generating unit 56. FIG. 3 is an explanatory diagram for explaining output timing of synchronization signals (timing signals) generated by the synchronization timing generating apparatus 54. The timing generating unit 56 is equipped with a synchronization signal generator (SYNC GEN) 561, an enable signal generator (ENB GEN) 562, a synchronization control unit (SYNC CNT) 563, selectors 564 for selecting the synchronization timing, and selectors 565 for selecting the enable signals, and a timing producing data storage unit 566. The selectors 564 for the synchronization timing are provided in accordance with preselected numbers (N pieces) of channels which are stored in the IP gateway apparatus. The selectors 565 for the enable signal are provided in accordance with the total channel number. The timing producing data storage unit 566 stores therein timing producing data used in the synchronization control unit 563.

The synchronization signal generator 561 outputs a plurality of synchronization signals (timing signals) SYNC-1, SYNC-2, SYNC-3, . . . , SYNC-n, which correspond to a total number of channels, at a proper timing, while 10 milliseconds are defined as a unit time period. In this example, the first synchronization signal SYNC-1 is set as a basic synchronization signal. While the respective output terminals of the synchronization signal generator 561 are connected via signal lines to the input terminals of each of the selectors 564, the synchronization signals are inputted to the respective selectors 564.

The above-explained 10 milliseconds correspond to minimum encoding period time of the CODEC processing unit 22. In the CODEC processing unit 22, the minimum encoding period time implies such a minimum time interval which is required in the case that an encoding process operation (encoding) with respect to a certain channel is carried out.

With respect to each of these synchronizations, in such a case that 10 milliseconds are subdivided by an "α" second into plural short time periods, anyone of the synchronization signals are raised within each of the "α"-second time periods. This "α"-second corresponds to a time period enough to execute the CODEC processing operation (packeting process operation) 1 time with respect to a single channel. For example, as shown in FIG. 3, the synchronization signals are produced in accordance with the following manner. That is, the synchronization signal SYNC-1 is produced during a first "α"-second period from a commencement within a 10-millisecond time period, the synchronization signal SYNC-2 is produced during a second "α"-second period, and the synchronization signal SYNC-3 is produced during a third "α"-second period, and so on. As previously explained, the respective synchronization signals are produced, while having a phase difference of "α."

Referring back to FIG. 2, the enable signal generator 562 outputs plural sorts (5 sorts in this example) of enable signals (permission signals) 2a-ENB, 2b-ENB, 3a-ENB, 3b-ENB, and 3c-ENB at preselected timing. While the respective output terminals of the enable signal generator 562 are connected via signal lines to the input terminals of the respective selectors 565, the respective enable signals are entered into the respective selectors 565.

In this example, as shown in FIG. 3, the enable signal 2a-ENB is generated in a 20-millisecond time period. The enable signal 2b-EMB is generated in a 20-millisecond time period under such a condition that a phase of this enable signal 2b-EMB is shifted by 10 milliseconds with respect to a phase of the first-mentioned enable signal 2a-ENB. Also, the enable signal 3a-ENB is generated in a 30-millisecond time period. The enable signal 3b-ENB is generated in a 30-millisecond time period under such a condition that a phase of this enable signal 3b-ENB is shifted by 10 milliseconds with respect to a phase of the first-mentioned enable signal 3a-ENB. Then, the enable signal 3c-ENB is generated in a 30-millisecond time period under such a condition that a phase of this enable signal 3c-ENB is shifted by 10 milliseconds with respect to the phase of the second-mentioned enable signal 3b-ENB.

The reason why the 5 sorts of enable signals are generated in this example is given as follows. That is, the CODEC processing unit 22 employed in the packeting apparatus 21 performs the coding process operation in accordance with any one of CODEC types (namely, time periods of CODEC process operations), namely 10 ms, 20 ms, and 30 ms as to each of the channels. As a result, the synchronization signals are required to be supplied to the respective packeting units 21 and 31 in response to the CODEC types. As explained above, to this end, the enable signals are produced in the 20-millisecond time period under such a condition that the phases thereof are shifted by 10 milliseconds, and also, the enable signals are generated in the 30-millisecond time period under such a condition that the phases thereof are shifted by 10 milliseconds.

Referring back to FIG. 2, the respective selectors 564 are connected via signal lines to the synchronization control unit 563. Each of these selectors 564 outputs any one of the synchronization signals inputted from the synchronization signal generator 561 in response to a synchronization signal selection signal entered from the synchronization control unit 563 and the enable signal entered from the selector 565.

Also, the respective selectors 565 are connected via signal lines to the synchronization control unit 563 so as to receive the enable signal selection signal from this synchronization control unit 563. While the output terminals of the selectors 565 are connected to the selectors 564, the selectors 565 input any of the enable signals outputted from the enable signal generator 562 into the selectors 564 in accordance with the enable signal selection signals.

The synchronization control unit 563 inputs the enable signal selection signal with respect to any one of the selectors 565 and also inputs the synchronization signal selection signal with respect to any one of the selectors 564 in response to timing producing data which is written into the timing producing data storage unit 566.

The timing producing data storage unit 566 stores therein both an offset value used to output the synchronization signal selection signal and a time period value used to output the enable signal selection signal as to the timing producing data as to each of the channels. Both the offset value and the time period value are written by the synchronization timing determining unit 55.

With employment of the above-explained arrangement, the timing generating unit 56 outputs the synchronization signals (synchronization timing) with respect to the respective channels in accordance with a combination with a synchronization signal "SYNC" and an enable signal "ENB."

For instance, the timing generating unit 56 generates synchronization timing having a 20-millisecond time period and a phase shifted with respect to another synchronism timing in response to a combination between each of the synchronization signals and either the enable signal 2a-ENB or the enable signal 2b-ENB.

Alternatively, as indicated in FIG. 3, the timing generating unit 56 generates synchronization timing (synchronization timing SYNC-1+2a-ENB) having a 20-millisecond time period, which is raised at a commencement of 10 milliseconds in response to a combination between the synchronization signal SYNC-1 and the enable signal 2a-ENB.

Alternatively, the timing generating unit 56 generates synchronization timing (synchronization timing SYNC-2+2b-ENB) having a 20-millisecond time period and a phase shifted with respect to another synchronism timing SYNC-1+2a-ENB by a shift (10 milliseconds+α seconds) in response to a combination between the synchronization signal SYNC-2 and the enable signal 2b-ENB.

Alternatively, when such a "through" condition is set under which any one of the synchronization signals, for example, the synchronization SYNC-3 is continuously selected by the selector 564, the synchronization timing (timing "SYNC-3 through") is generated in a 10-millisecond time period.

Also, the timing generating unit 56 generates synchronization timing having a 30-millisecond time period and a phase shifted with respect to other synchronization timings in response to a combination between each of the synchronization signals and each of the enable signals 3a-ENB, 3b-ENB, and 3c-ENB. In FIG. 3, the respective timing SYNC-2+3a-ENB, SYNC-3+3b-ENB, and SYNC-n+3c-ENB. As previously explained, the timing generating unit 56 generates the synchronization signals (synchronization timing) with respect to the respective channels in the 10-millisecond time period, the 20-millisecond time period, and the 30-millisecond time period.

Figure 4:
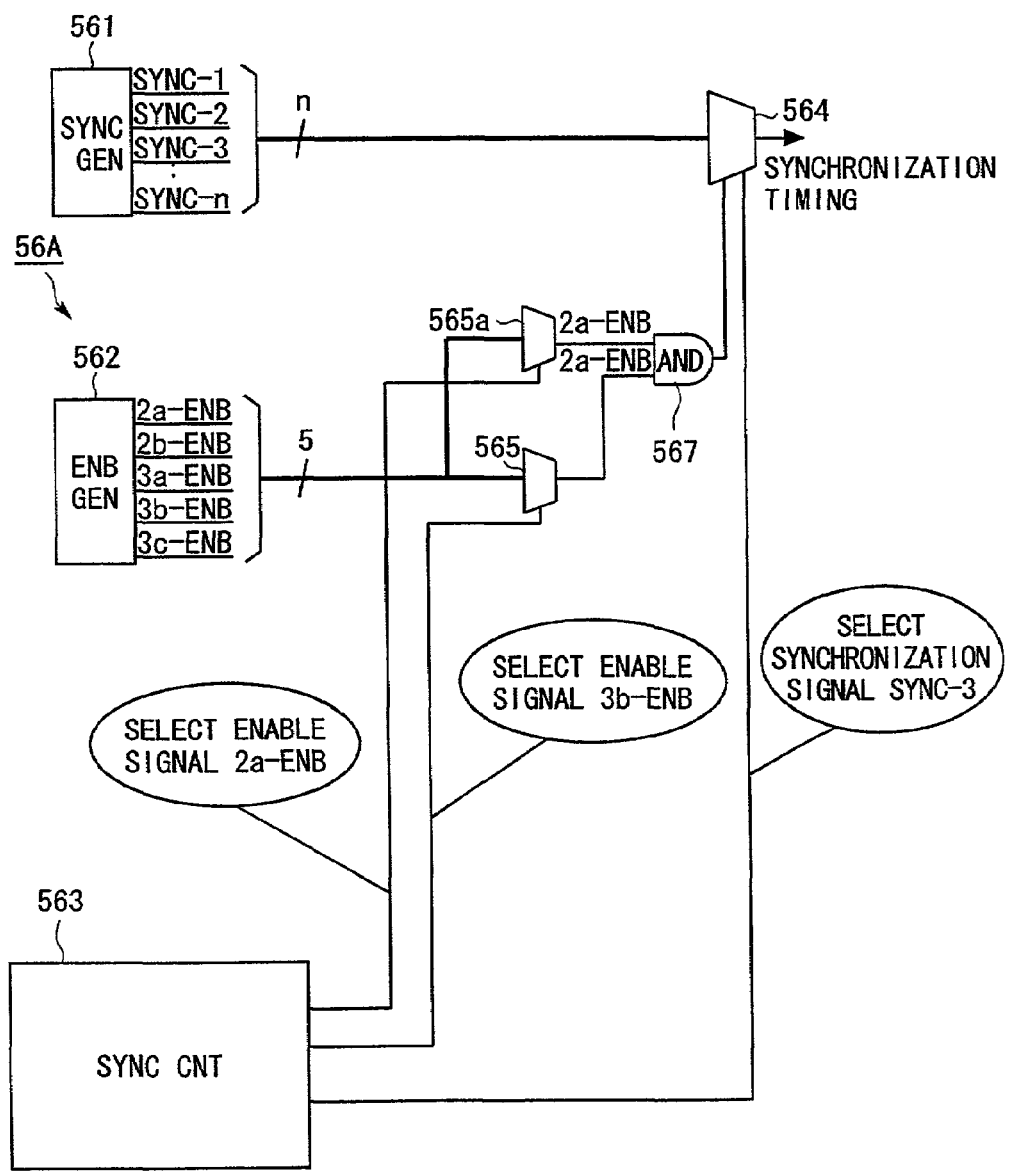
FIG. 4 is a schematic block diagram for representing an arrangement of another synchronization timing generating apparatus.

Furthermore, the timing generating unit 56 outputs a synchronization signal (synchronization timing) in a 60-millisecond time period with respect to each of the channels in response to a combination between two enable signals. FIG. 4 is a diagram for schematically showing a hardware structure of a timing generating unit 56A capable of generating synchronization timing in a 60-millisecond time period.

As shown in FIG. 4, in the timing generating unit 56A, selectors 565 and 565a for selecting two enable signals are provided with respect to the selector 564 for a single synchronization signal. The output terminals of the respective selectors 565 and 565a are connected to input terminals of an AND circuit (AND gate circuit) 567, and the enable signals outputted from the respective selectors 565 and 565a are inputted to this AND circuit 567. An output terminal of the AND circuit 567 is connected to the selector 564 for the synchronization signal.

In the case that the synchronization signal is outputted in the 60-millisecond time period, the synchronization control unit 563 inputs, for instance, such a synchronization signal selection signal used to select the synchronization signal SYNC-3 into the selector 564. Also, the synchronization control unit 563 enters, for example, such an enable signal selection signal used to select the enable signal 2a-ENB into the selector 565a, and at the same time, inputs such an enable signal selection signal used to select the enable signal 3b-ENB into the selector 565. As a result, both the enable signal 2a-ENB and the enable signal 3b-ENB are entered into the AND circuit 567. Only when both the enable signal 2a-ENB and the enable signal 3b-ENB are inputted to the AND circuit 567 at the same time, does the AND circuit 567 input the enable signal into the selector 564. As a consequence, the synchronization signal SYNC-3 is outputted from the selector 564 in the 60-millisecond time period.

It should be noted in this embodiment that for the sake of easy explanation, the timing generating unit 56 and the timing generating unit 56A are illustrated in separate drawings. In an actual case, both the timing generating unit 56 and the timing generating unit 56A are arranged as a single combined circuit.

[OPERATION EXAMPLE 1]

Next, a description will now be made of an example of operations of the above-described IP gateway apparatus 100 according to this embodiment. First, as an operation example 1, a timing value determining method for synchronization timing is described which is applied in a "call-by-call" manner (for every call) for every channel.

FIG. 5 is a flow chart for describing a process operation defined by that after the control unit 50 has received a call setting signal (SETUP), transmissions and connections of synchronization signals (timing signals) are instructed with respect to the respective cards 20 and 30.

In the case that a subscriber (namely, subscriber terminal) stored in a PSTN (Public Switched Telephone Network) requests a connection with respect to a subscriber (namely, subscriber terminal) stored in an IP (Internet Protocol) network, a connection request signal (control signal) is transmitted to the IP gateway apparatus 100 corresponding to the gateway between the PSTN and the IP network.

In the IP gateway apparatus 100, the connection request signal functioning as the control signal is received by the control signal receiving unit 51 (S1). The control signal receiving unit 51 judges a type of the received connection request signal, and when the connection request signal corresponds to the call setting signal ("YES" at S2), the control signal receiving unit 51 requests to produce an instance with respect to the call control unit 52 (to allocate channel), and executes a transmission process operation of the call setting signal (S3 and S4).

Figure 6A:
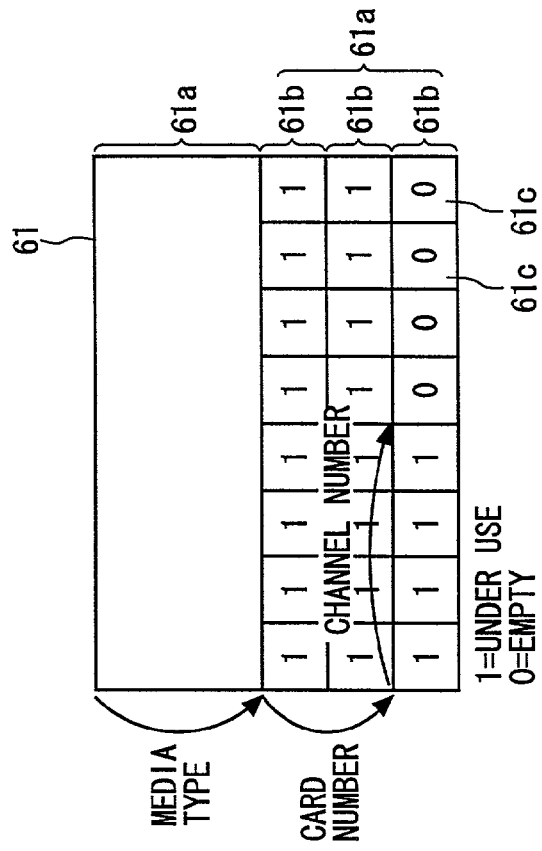
FIG. 6 is a flow chart for explaining a process operation of a channel capturing unit.
Figure 6B:
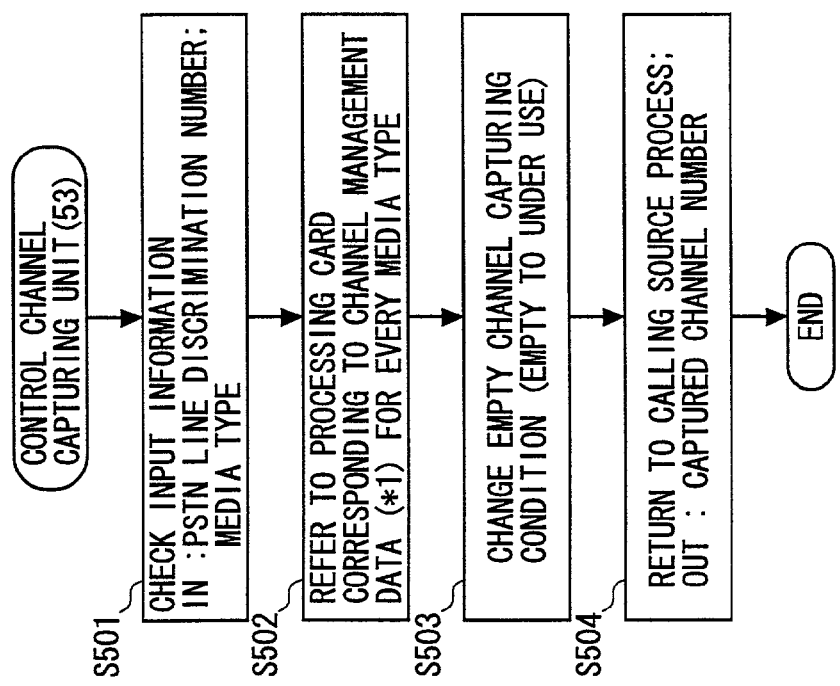

Upon receipt of the call setting signal, the call control unit 52 first calls the channel capturing unit 53, and then issues a channel capture request to the channel capturing unit 53. FIG. 6(A) is a flow chart for explaining a process operation (defined at S5) executed by the channel capturing unit 53, and FIG. 6(B) is an explanatory diagram for explaining the contents of the call number management data storage unit 61 (channel management data corresponding to processing card for every media type) shown in FIG. 2.

In FIG. 6(A), the channel capturing unit 53 first judges a media type (either voice or data) of the relevant line based upon the line discrimination number of the PSTN interface unit 10, which constitutes input information (S501).

Next, the channel capturing unit 53 refers to the call number management data storage unit 61 by employing the media type acquired as the judgement result (S502). As shown in FIG. 6(B), the call number management data storage unit 61 is constructed of a plurality of areas 61a (hereinafter will be referred to as "media areas") in response to the media type (either voice or data). Each of the media areas 61a is subdivided into a plurality of areas (hereinafter will be referred to as "card areas") 61b which are related to the respective cards corresponding to the media types. Each of these card areas 61b is furthermore constituted by a plurality of channel condition areas 61c which are provided for every channel number handled by this card. Each of the channel condition areas 61c stores a channel condition which is defined by 1 bit made of "0 (empty)" and "1 (under use)."

The channel capturing unit 53 specifies the corresponding media area 61a based upon the media type acquired as the judgement result. Next, the channel capturing unit 53 retrieves a channel under empty state "0" by sequentially referring to the respective channel condition areas 61c from a top channel condition area as to the card area 616 located at a top position. In the case that all of the channel condition areas 61c of the card area 61b located at the top position are equal to "1 (under use)", the channel capturing unit 53 performs a similar process operation with respect to the next card area 61b. It should be understood that as to the method for referring to the respective channel condition area 61b contained in the media area 61a, any other referring methods may be employed if channels under empty states can be captured by these other methods.

When the channel capturing unit 53 captures such a channel under an empty state, the channel capturing unit 53 acquires the channel number of this empty channel, and further, changes the bit indicative of the channel state of this empty channel from "0 (empty)" into "1 (under use)" (S503).

Next, the channel capturing unit 53 sets (or stores) the CODEC type corresponding to one of parameters contained in the call setting signal into the CODEC type management data storage unit 63, and applies the channel number of the channel captured as an output to the call control unit 52 (S504).

Referring back to FIG. 5, the call control unit 52 calls the synchronization timing determining unit 55 so as to determine the synchronization timing which is applied to the captured channel, and then applies the captured channel number. As a result, the synchronization timing determining unit 55 executes the following process operation (S6).

Figure 7:
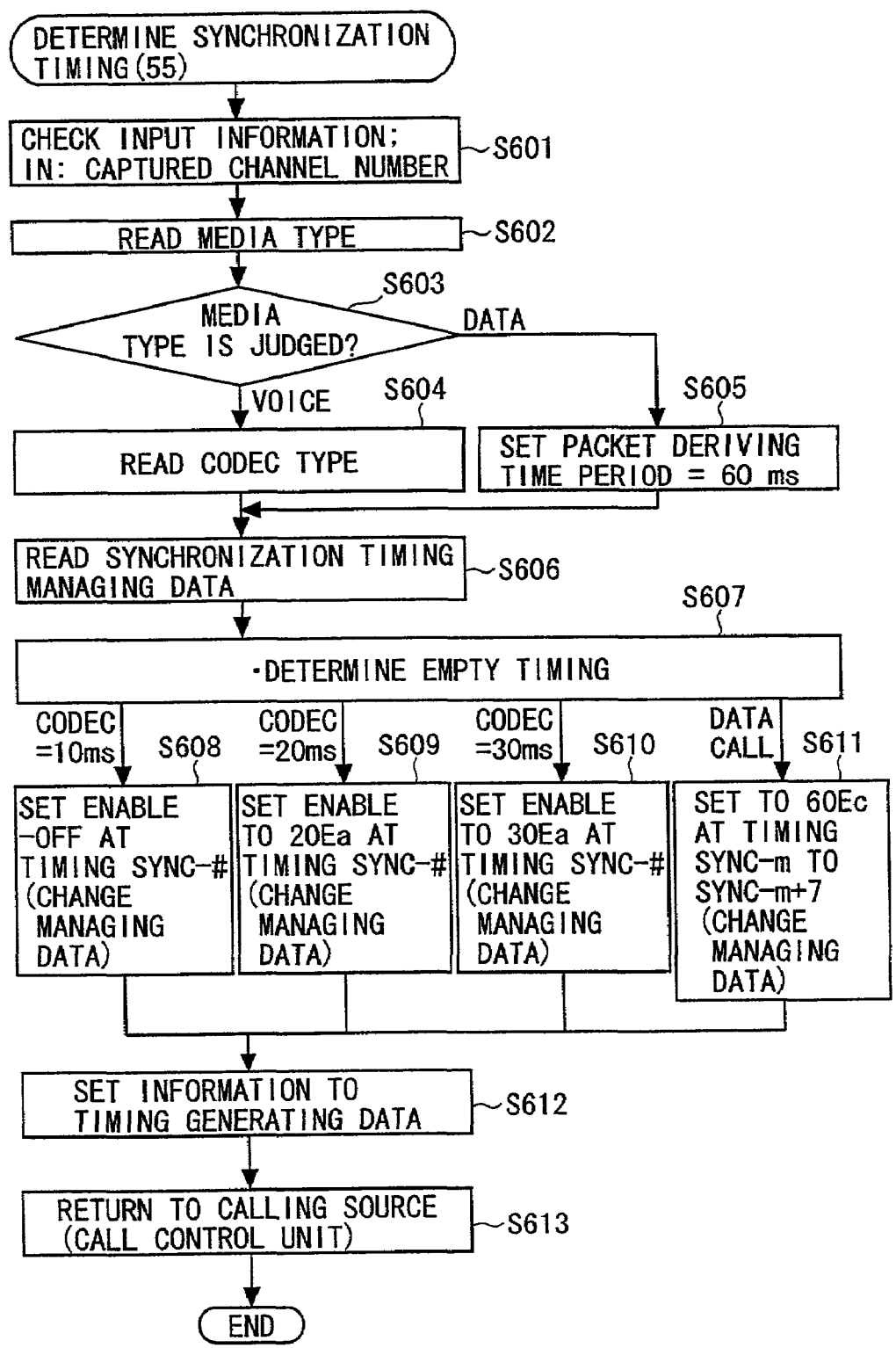
FIG. 7 is a flow chart for describing a process operation of a synchronization timing determining unit.

FIG. 7 is a flow chart for describing a detailed content of the process operation defined at step S6 and executed by the synchronization timing determining unit 55. In FIG. 6, the synchronization timing determining unit 55 checks a channel number which is applied as input information from the call control unit 52 (S601). Next, the synchronization timing determining unit 55 reads out a media type from the media delay characteristic data storage unit 62 based upon the channel number which constitutes the input information (S602).

Next, the synchronization timing determining unit 55 judges as to whether the read media type corresponds to data, or voice (S603). At this time, when the media type corresponds to the voice, the process operation is advanced to a step S604, whereas when the media type corresponds to the data, the process operation is advanced to another step S605.

At the step S604, the synchronization timing determining unit 55 reads the CODEC type management data corresponding to this channel number from the channel corresponding CODEC type management data storage unit 63. The synchronization timing determining unit 55 determines the time period for deriving the voice packet from any one of, for example, 10 milliseconds, 20 milliseconds, and 30 milliseconds in accordance with the read CODEC type. On the other hand, at the step S605, the synchronization timing determining unit 55 determines the time period for deriving the data packet as 60 milliseconds. When the process operation defined at the step S604, or the step S605 is accomplished, the synchronization timing determining process operation is advanced to a step S606.

Figure 8:
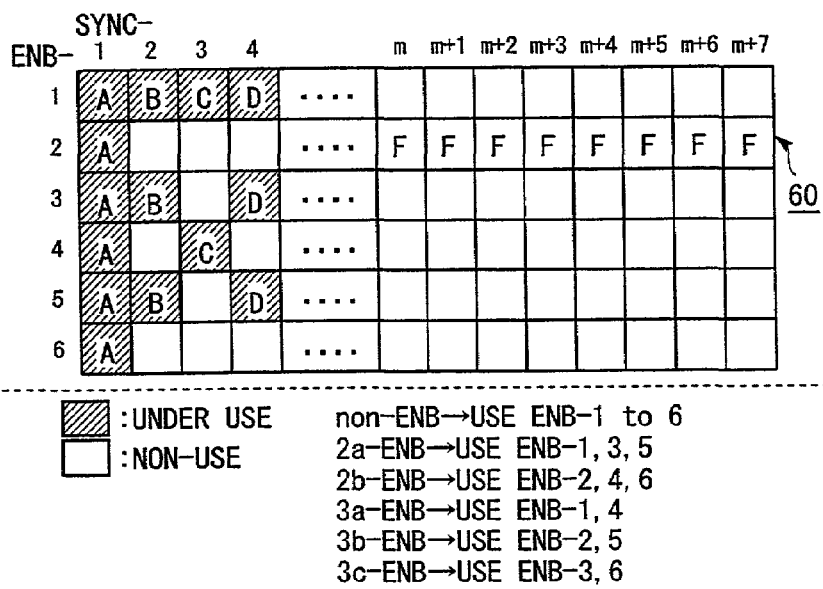
FIG. 8 is a schematic block diagram for showing an arrangement of a synchronization timing management data storing unit.

At the step S606, the synchronization timing determining unit 55 reads out the synchronization timing management data from the synchronization timing management data storage unit 60. FIG. 8 is a diagram for representing a data structure of data stored in the synchronization timing management data storage unit 60.

As indicated in FIG. 8, the synchronization timing management data storage unit 60 stores therein as the synchronization timing management data, a map indicative of a use condition of synchronization timing made by combining a synchronization signal with an enable signal.

An abscissa of the map indicates the synchronization signals SYNC-1, SYNC-2, . . . , SYNC-m, SYNC-m+1, . . . , SYNC-n. The "α" second indicated in FIG. 3 is assumed as unit time. An ordinate of the map shows symbols EMB-1, EMB-2, . . . , EMB-6, which represent output permission time of the synchronization signal SYNC, and 10 millimeters are assumed as unit time. A bit of the coordinate system may be specified by a coordinate value (SYNC-# (#=1 to n)) of the abscissa of the map and a coordinate value (ENB-X (X=1 to 6) of the ordinate thereof. Each bit is used as a flag indicative of use/non-use of synchronization timing. A bit value "0" shows that synchronization timing thereof is not used, whereas a bit value "1" indicates that synchronization timing thereof is under use. It should also be noted that the above-explained definitions as to the bit values and the use/non-use may be replaced by opposite definitions.

The respective output permission periods ENB-1 to ENB-6 are used as follows. That is, when an enable signal is not present, all of the output permission periods ENB-1 to ENB-6 are used. As a result, it is so set that the selected (corresponding) synchronization signal is outputted from the timing generating unit 56 for every 10 milliseconds.

In the case that the enable signal 2a-ENB is used, the output permission time periods ENB-1, ENB-3, and ENB-5 are used, whereas in such a case that the enable signal 2b-ENB is used, the output permission time periods ENB-2, ENB-4, and ENB-6 are used. As a result, it is so set that the selected (corresponding) synchronization signal is outputted from the timing generating unit 56 for every 20 milliseconds (in time period of 20 milliseconds).

In the case that the enable signal 3a-ENB is used, the output permission time periods ENB-1, and ENB-4 are used, whereas in such a case that the enable signal 3b-ENB is used, the output permission time periods ENB-3, and ENB-6 are used. As a result, it is so set that the selected (corresponding) synchronization signal is outputted from the timing generating unit 56 for every 30 milliseconds (in time period of 30 milliseconds).

The synchronization timing management data storage unit 60 is used as follows. For example, in such a case that the media type corresponds to the voice, and such a decision is made that the synchronization timing determining unit 55 uses the synchronization signal SYNC-1 while the CODEC type is 10 milliseconds, a flag of "A" shown in FIG. 8 is set to "ON (under use)."

Also, for instance, if a decision is made that the synchronization timing determining unit 55 uses the synchronization signal SYNC-2 (SYNC-4) while the CODEC type is 20 milliseconds, a flag of "B(D)" shown in FIG. 8 is set to "ON (under use)." Furthermore, for example, if a decision is made that the synchronization timing determining unit 55 uses the synchronization signal SYNC-3 while the CODEC type is 30 milliseconds, a flag of "C" shown in FIG. 8 is set to "ON (under use)."

When the media type corresponds to the data (when media type corresponds to data call), it is so set that one data packet processing operation is equal to a preselected number (8 in this example) of voice packet processing operations. For example, the following conditions are set. While the synchronization signals SYNC-m up to SYNC-m+7 are used, the synchronization signals are outputted only during the output permission period ENB-2, and the flag of "F" shown in FIG. 8 is set to "ON (under use)." In other words, the control operation is carried out in such a manner that while the enable signal 2b-ENB is combined with the enable signal 3b-ENB, a data packet is processed in a time period of 60 milliseconds.

Referring back to FIG. 7, the synchronization timing determining unit 55 specifies such synchronization timing which is not presently used and under an empty state, by referring to the read synchronization timing management data (FIG. 8) (S607). The synchronization timing determining unit 55 determines the specified synchronization timing as synchronization timing to be used as to the corresponding channel, and registers the synchronization timing management data corresponding to this synchronization timing into the synchronization timing data storage unit 60.

In other words, at the step S607, in the case that the media type of the channel is the voice, and furthermore the CODEC type corresponds to "10 milliseconds", the process operation is advanced to a step S608. Also, in the case that the media type of the channel is the voice, and furthermore the CODEC type corresponds to "20 milliseconds", the process operation is advanced to a step S609. Also, in the case that the media type of the channel is the voice and furthermore, the CODEC type corresponds to "30 milliseconds", the process operation is advanced to a step S610. Also, when the media type is the data, the process operation is advanced to a step S611.

At the step S608, the synchronization timing determining unit 55 registers into the synchronization timing management data storage unit 60, such a setting operation that an enable signal is turned OFF as to an arbitrary synchronization signal "SYNC-# (symbol "#" indicates an arbitrary state)", namely such a setting operation that the synchronization signal SYNC-# is outputted in the time period of 10 milliseconds (synchronization timing management data is changed).

At the step S609, the synchronization timing determining unit 55 registers into the synchronization timing management data storage unit 60, such a setting operation that an enable signal is applied in such a manner that the arbitrary synchronization signal SYNC-# is outputted in the time period of 20 milliseconds (synchronization timing management data is changed).

At the step S610, the synchronization timing determining unit 55 registers into the synchronization timing management data storage unit 60, such a setting operation that an enable signal is applied in such a manner that the arbitrary synchronization signal SYNC-# is outputted in the time period of 30 milliseconds (synchronization timing management data is changed).

At the step S611, the synchronization timing determining unit 55 registers into the synchronization timing management data storage unit 60, such a setting operation that an enable signal is applied in such a manner that a predetermined continuous number (8 in this example) of synchronization signals SYNC-m to SYNC-m+7 are outputted in the time period of 60 milliseconds.

When any one of the processing operations defined at the steps S608 to the step S611 is accomplished, the synchronization timing determining unit 55 sets a channel number, an offset value, and a time period value related to synchronization timing, which is newly registered into the synchronization timing management data storage unit 60, to the timing producing data storage unit 566 (see FIG. 2) (step S612). Thereafter, the synchronization timing determining unit 55 accomplishes the process operation (return to call control unit 52: S613).

Returning back to FIG. 5, the timing generating unit 56 starts to transmit to the newly captured channel, such synchronization timing made by combining the synchronization signal generated from the synchronization signal generator 561 with the enable signal generated from the enable signal generator 562 in response to the instruction of the synchronization control unit 563 at such a chance that both the offset value and the time period value are written into the timing producing data storage unit 566 (S7).

The synchronization signal SYNC outputted from the timing generating unit 56 of the synchronization timing generating apparatus 54 is inputted into the synchronization signal notifying unit 58, and then, the synchronization signal notifying unit 58 transmits the entered synchronization signal to such a card which handles the channel of the channel number corresponding to this synchronization signal.

Upon receipt of the synchronization signals transmitted from the synchronization signal notifying unit 58, the communication units 27 and 37 of the respective cards 20 and 30 supply the received synchronization signals as the packet deriving commencement instruction to either the CODEC processing unit 22 and the voice packet deriving unit 23 or the MODEM processing unit 32 and the data packet deriving unit 33.

On the other hand, the call control unit 52 supplies the call setting instruction as to the captured channel to the communication unit 59. Then, the communication unit 59 transmits the call setting instruction (containing channel number, CODEC type (processing time period), fragment length, and the like) to either the card 20 or the card 30, which stores the captured channel.

The transmitted call setting instruction is received by either the communication unit 27 of the card 20 or the communication unit 37 of the card 30, and then is supplied to either the packeting apparatus 21 or the pocketing apparatus 31. As a result, either the packeting apparatus 21 or the packeting apparatus 31 commences the packeting process operation in accordance with the content of the call setting instruction with respect to the channel of the channel number contained in the call setting instruction (S9).

Thereafter, when the CODEC processing unit 22 of the packeting apparatus 21 receives the deriving commencement instruction (synchronization timing), this CODEC processing unit 22 commences such a process operation that a PCM signal derived from a channel corresponding to the received deriving commencement instruction into a voice packet, and then the converted voice packet is stored into a buffer. The voice packet deriving unit 23 derives the voice packet stored in the buffer, and then supplies the derived voice packet to the voice packet transmitting unit 24. These process operations are carried out within "α" seconds after the deriving commencement instruction has been applied to both the CODEC processing unit 22 and the voice packet deriving unit 23, and also at such timing which is not overlapped with the timing of the process operations with respect to the channels of other voice packets and all of the data packets.

The voice packet transmitting unit 24 adds the header of the layer 3 to the voice packet received from the voice packet deriving unit 23, and thereafter, supplies this voice packet added with the header to the communication unit 26. The communication unit 26 transmits the voice packet to the communication unit 41 of the IP interface unit 40. The transmitted voice packet is received by the communication unit 41 of the IP interface unit 40, and the header of the layer 2 is added to this received voice packet by the IP packet editing process unit 42. Thereafter, the resulting voice packet is sent to the IP network by the main signal transmitting unit 43.

On the other hand, when both the MODEM processing unit 32 and the data packet deriving unit 33 receive the deriving commencement instruction from the communication unit 37, these MODEM processing unit 32 and the data packet deriving unit 33 commence such a process operation that a PCM signal of a channel corresponding to this deriving commencement instruction is converted into a data packet, and then, the converted data packet is stored into a buffer. The data packet deriving unit 33 derives the data packet stored in the buffer, and then supplies the derived data packet to the data packet transmitting unit 34. These process operations are carried out within "α" seconds after the deriving commencement instruction has been applied to both the MODEM processing unit 32 and the data packet deriving unit 33, and also at such timing which is not overlapped with the timing of the process operations with respect to the channels of other data packets and all of the voice packets.

The data packet transmitting unit 34 adds the header of the layer 3 to the data packet received from the data packet deriving unit 33, and thereafter, supplies this data packet added with the header to the communication unit 36. The communication unit 36 transmits the data packet to the communication unit 41 of the IP interface unit 40. The transmitted data packet is received by the communication unit 41 of the IP interface unit 40, and the header of the layer 2 is added to this received data packet by the IP packet editing process unit 42. Thereafter, the resulting data packet is sent to the IP network by the main signal transmitting unit 43.

<Concrete Examples>

A concrete example of the operations of the IP gateway apparatus 100 will now be explained in such a case that while the CODEC types which may be provided to the voice by the IP gateway apparatus 100 are selected to be 3 types of 10 milliseconds/20 milliseconds/30 milliseconds, a process operation for a single data packet corresponds to a process operation for 8 voice packets (in the case that processing time of data packet is fixed to such processing time 8 times longer than processing time of voice packet).

Concrete Example 1

Referring now to an explanatory diagram shown in FIG. 9, as a concrete example 1, operations of the IP gateway apparatus 100 will be explained in the case that the captured channel number is "No. 10", the media type is "voice", and the CODEC type is "20 milliseconds." In such a case that the use condition of the synchronization timing held by the synchronization timing management data storage unit 60 corresponds to such a condition shown in FIG. 9(A), such synchronization timing which corresponds to the synchronization timing under non-use condition, and also the phase difference between the own synchronization timing and the basic synchronization timing (SYNC-1) is minimum is equal to SYNC-3.

As a result, the synchronization timing determining unit 55 adds a setting condition (synchronization timing management data) under which the synchronization signal SYNC-3 is outputted in the time period of 20 milliseconds to the synchronization timing management data storage unit 60. Accordingly, the storage content of the synchronization timing management data storage unit 60 is changed. As indicated in FIG. 9(B), for example, as to the synchronization signal SYNC-3, the respective enable signals ENB-1, ENB-3, and ENB-5 are set to "under use."

Thereafter, the synchronization timing determining unit 55 sets the synchronization timing information (both offset value and time period value) related to the setting condition added into the synchronization timing management data storage unit 60 to the timing producing data storage unit 566. For example, as indicated in FIG. 9(C), as the synchronization timing information corresponding to the channel number "10", both the offset value "SYNC-3" and the time period value "20 ms(2a-ENB)" are set to the timing producing data storage unit 566.

The data "SYNC-3" stored in the timing producing data storage unit 566 shows the synchronization signal SYNC-3, and the data "20 ms(2a-ENB)" stored in the timing producing data storage unit 566 represents that the synchronization signal "SYNC-3" is outputted in the time period of 20 milliseconds at the timing of ENB-1, ENB-3, and ENB-5.

Concrete Example 2

Referring to an explanatory diagram of FIG. 10, as a concrete example 2, operations of the IP gateway apparatus 100 will be described in the case that the captured channel number is "No. 5", and the media type is "data." When the media type is "data", since the delay characteristic is not so strict, a setting operation is carried out in such a manner that a data packet is derived in the time period of 60 millimeters.

In the case that the use condition of the synchronization timing held in the synchronization timing management data storage unit 60 is such a condition shown in FIG. 10(A), SYNC-m to SYNC-n are empty as the synchronization timing under non-use condition. As a result, the synchronization timing determining unit 55 additionally provides such a setting condition to the synchronization timing management data storage unit 60, in which the synchronization timing SYNC-m to SYNC-m+7 is used in the time period of 60 milliseconds, while the synchronization timing (offset value thereof) applied to channel number "5" is defined as SYNC-m (see FIG. 10(B)).

Thereafter, the synchronization timing determining unit 55 sets the synchronization timing information (both offset value and time period value) related to the setting condition added into the synchronization timing management data storage unit 60 to the timing producing data storage unit 566.

For example, as indicated in FIG. 10(C), as the synchronization timing information corresponding to the channel number "5", both the offset value "SYNC-m" and the time period value "60 ms (2a-ENB+3b-ENB)" are set to the timing producing data storage unit 566. The set data "SYNC-m" shows an offset value "SYNC-m" of a synchronization signal. The data "60 ms(2a-ENB+3b-ENB)" shows such an operation that the synchronization signals "SYNC-m" to "SYNC-m+7" are outputted in the time period of 60 milliseconds within the output permission time period ENB-2.

As previously described, in such an IP gateway apparatus 100 that a plurality of media types are mixed with each other, the starting chance of the packeting process operation can be variably applied with respect to each of the media types. As a consequence, the processing time ranges can be separated from each other with respect to each of the media.

OPERATION EXAMPLE 2

Next, as an operation example 2, a description will now be made of a method for generating synchronization timing, variable in correspondence with a channel in a "call by call" manner (for every call) by the synchronization timing generating apparatus 54.

As indicated in FIG. 2, the timing generating unit 56 is arranged by the synchronization signal generator 561, the enable signal generator 562, and the synchronization control unit 563, which are constructed of hardware logic circuits. The timing generating unit 56 supplies the synchronization signal to the packeting apparatuses 21 and 31 of the respective cards 20 and 30 for every channel, and this synchronization signal is produced in accordance with the timing producing data which is set by the synchronization timing determining unit 55.

FIG. 3 represents the respective signal timings generated by the timing generating unit 56. Symbols "SYNC-1" through "SYNC-n" correspond to synchronization timing generated by the synchronization signal generator 561. Within the minimum encoding period time (10 milliseconds), the respective synchronization timing is produced, while each synchronization timing owns a phase difference "α" which is larger than, or equal to a time duration required for executing a packeting process operation. A total number of each synchronization timing is equal to that of lines stored in the IP gateway apparatus 100.

In this case, the phase difference "α" should satisfy the below-mentioned condition:

processing time required for packeting ≦ phase difference "α", and minimum encoding period time ≧ phase difference "α"×n (symbol "n" being stored line (channel) number).

Symbols "2a-ENB" to "3c-ENB" shown in FIG. 3 represent output enable signals of synchronization timing generated by the enable signal generator 562. The enable signal generator 562 generates such an enable signal (permission signal) having the minimum encoding period time (10 milliseconds) under such a condition that this enable signal is generated in each of the encoding period intervals of the plural CODEC types which are provided by the IP gateway apparatus 100, and also this enable signal is generated in synchronism with the basic synchronization timing.

The synchronization control unit 563 controls the selector 564 for selecting the synchronization timing corresponding to the respective channels in accordance with an offset value of the timing producing data storage unit 566 (management table) so as to select one of "n" sorts of synchronization timing. Similarly, the synchronization control unit 563 controls the selector 565 for selecting the enable signals corresponding to the respective channels in accordance with the time period value of the timing producing data storage unit 566 (management table) in order to select one of the plural enable signals. As a result, a combination between the synchronization timing and the enable signal may be freely set in the unit of the line. The synchronization signals sent out to the respective channels may be combined with the enable signals as follows.

(1) Outputting of arbitrary synchronization timing (any one of synchronization signals SYNC-1 to SYNC-n) in 10-millisecond time period.

The selector 564 for selecting the synchronization timing is set at arbitrary synchronization timing, and the selector 565 for selecting the enable signal is deasserted (such condition is established that enable signal is continuously outputted from selector 565). As a result, the arbitrary synchronization timing is entered into either the packeting apparatus 21 or the packeting apparatus 31 in the 10-millisecond time period.

(2) Outputting of arbitrary timing (anyone of synchronization signals SYNC-1 to SYNC-n) in arbitrary time period (2a-ENB to 3c-ENB).

The selector 564 for selecting the synchronization timing is set to arbitrary timing, and also, it is so set that an enable signal having an encoding time period (20 milliseconds, or 30 milliseconds) in response to a CODEC type of a channel is outputted from the selector 565 for selecting the enable signal. As a result, the arbitrary synchronization timing is entered into either the packeting apparatus 21 or the packeting apparatus 31 in the time period corresponding to the CODEC type.

(3) No synchronization signal.

The selector 564 for selecting the synchronization timing is deasserted.

OPERATION EXAMPLE 3

Figure 11:
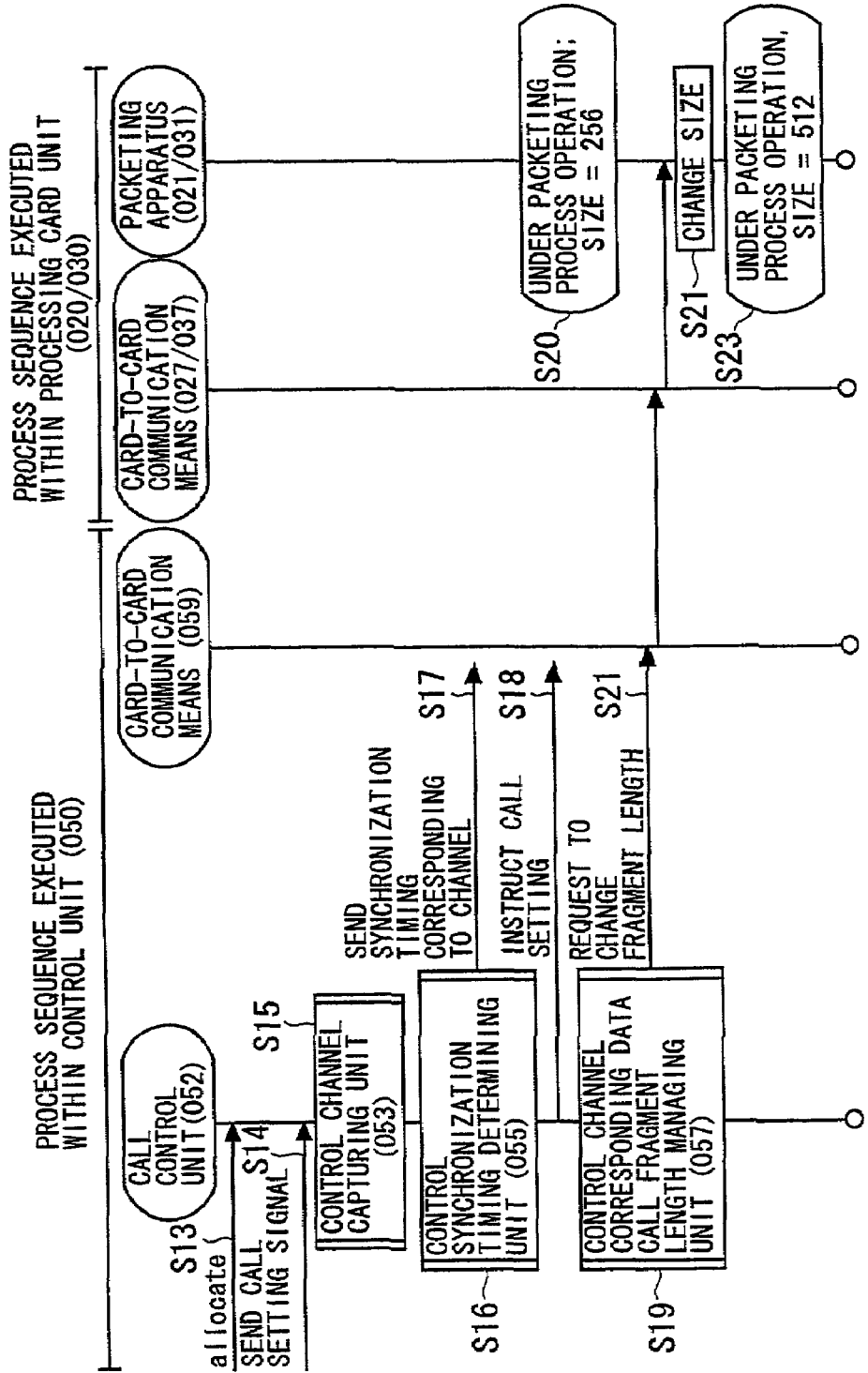
FIG. 11 is a sequential operation diagram representing a process operation of a fragment length managing unit.

Referring now to FIG. 11 and FIG. 12, as an operation example 3, a description will be made of a management method for changing a fragment length of a data packet in response to a system condition (CODEC type, call amount for each of media, delay time characteristic etc.) which is changed in a "call-by-call" manner (for every call)

FIG. 11 is a sequential operation diagram for explaining a process operation of the operation example 3. FIG. 11 indicates the following process operation. That is, after the call control unit 52 executes a call setting process operation, this call control unit 52 calls the fragment length managing unit 57 so as to determine as to whether or not a fragment length of a data packet is changed. When the fragment length is changed, the call control unit 52 instructs the respective cards 20 and 30 to change the fragment length.

FIG. 12 indicates a data structural diagram in the operation example 3 of the synchronization timing managing data storage unit 60 used to determine the synchronization timing, and represents management conditions established before/after a fragment length is changed.

In FIG. 11, such a process operation that the call control unit 52 receives the call setting signal, transmits the call setting instruction, and completes the call connection process operation is identical to that of the above-explained operation example 1 (S13 to S18). Thereafter, the call control unit 52 calls the fragment length managing unit 57 as a final process operation.

The fragment length managing unit 57 executes the below-mentioned process operation (S19). In other words, the fragment length managing unit 57 checks a use condition of synchronization timing applied to each of the channels by referring to the synchronization timing managing data storage unit 60 (see FIG. 12(A)). At this time, it is so assumed that as the synchronization timing of the process operation with respect to the data packet, a plurality of the synchronization timing "SYNC-m" to "SYNC-m+7" are used in the enable signal "ENB-2" in the synchronization timing managing data storage unit 60 (data packet size: 256 octets) (S20).

As a result of referring to the content of the synchronization timing managing data storage unit 60, the fragment length managing unit 57 judges that a fragment length of a data packet can be increased in such a case that a voice call amount is small, and further, there is an empty space in the synchronization timing applied with respect to a voice packet.

As a consequence, the fragment length managing unit 57 supplies a change instruction via the communication unit 59 to the card 30 which stores the channel of this data packet (S21). This change instruction instructs that the fragment length of the data packet is increased by a preselected fragment length. For example, this change instruction instructs that the fragment length is changed from 256 octets into 512 octets.

The change instruction is received by the communication unit 59 of the corresponding card 30, and then is applied to the packeting apparatus 31. As a result, the packeting apparatus 31 changes the fragment length of the data packet into such a size defined in accordance with the change instruction (S22). As a consequence, the fragment length of the data packet is changed from 256 octets into 512 octets (S23).

On the other hand, when the fragment length managing unit 57 transmits the change instruction, this fragment length managing unit 57 rewrites the storage content of the synchronization timing managing data storage unit 60. In the example shown in FIG. 12(A), the synchronization timing with respect to the channel of the data packet is changed from "SYNC-m to SYNC-m+7" into "SYNC-m−7 to SYNC-m+7" (portion surrounded by the broken line shown in FIG. 12(A) corresponds to a portion to be changed).

Furthermore, the fragment length managing unit 57 rewrites an offset value as to the channel corresponding to the timing producing data 566, while the synchronization timing management data is changed. In the example shown in FIG. 12(B), while the channel having the channel number "10" is set as the channel of the data packet, the fragment length managing unit 57 rewrites the offset value "SYNC-m" as to this channel into another offset value "SYNC-m−7."

With employment of the above-explained process operation, the fragment length of the data packet can be adjusted in the "call-by-call" manner (for every call), and also for every channel. As a consequence, the data packet processing operation can be effectively carried out without an occurrence of interference which is caused by the mutual process operations for every media.

Thereafter, in such a case that a new call is set, the fragment length managing unit 57 executes such a process operation that the fragment length of the data packet is decreased to a predetermined number when the fragment length managing unit 57 judges such a state that the voice call amount is increased, and thus, the synchronization timing under an empty state is decreased. This process operation is performed in an opposite sense with respect to the above-explained process operation. As a result, the fragment length of the data packet is reduced from, for example, 512 octets to 256 octets.

It should be noted that the rewriting process operation of both the synchronization timing managing data and the timing producing data by the above-explained fragment length managing unit 57 may be alternatively carried out by the synchronization timing determining unit 55 in response to an instruction issued from the fragment length managing unit 57.

OPERATION EXAMPLE 4

Next, as an operation example 4, a description will now be made of a packeting system operated by that the packeting apparatuses 21 and 31 of the respective cards 20 and 30 receive both a call setting instruction and a synchronization signal (synchronization timing) from the control unit 50, derive a packet in response to this call setting instruction, and then, send out the derived packet to the IP interface unit 40.

As a method for deriving a packet by either the packeting apparatus 21 of the card 20 or the packeting apparatus 31 of the card 30, the below-mentioned methods may be employed.

(1) In a packet deriving method, a packet deriving process operation is commenced at such a chance that an interruption is made from either the CODEC processing unit 22 or the MODEM processing unit 32.

(2) In another packet deriving method, either the packet deriving unit 23 or the packet deriving unit 33 regularly calls either the CODEC processing unit 22 or the MODEM processing unit 32 in a given constant time period (polling means). In this operation example 4, operations will now be explained when the polling method is introduced with reference to FIG. 1 and FIG. 13.

Figure 13:
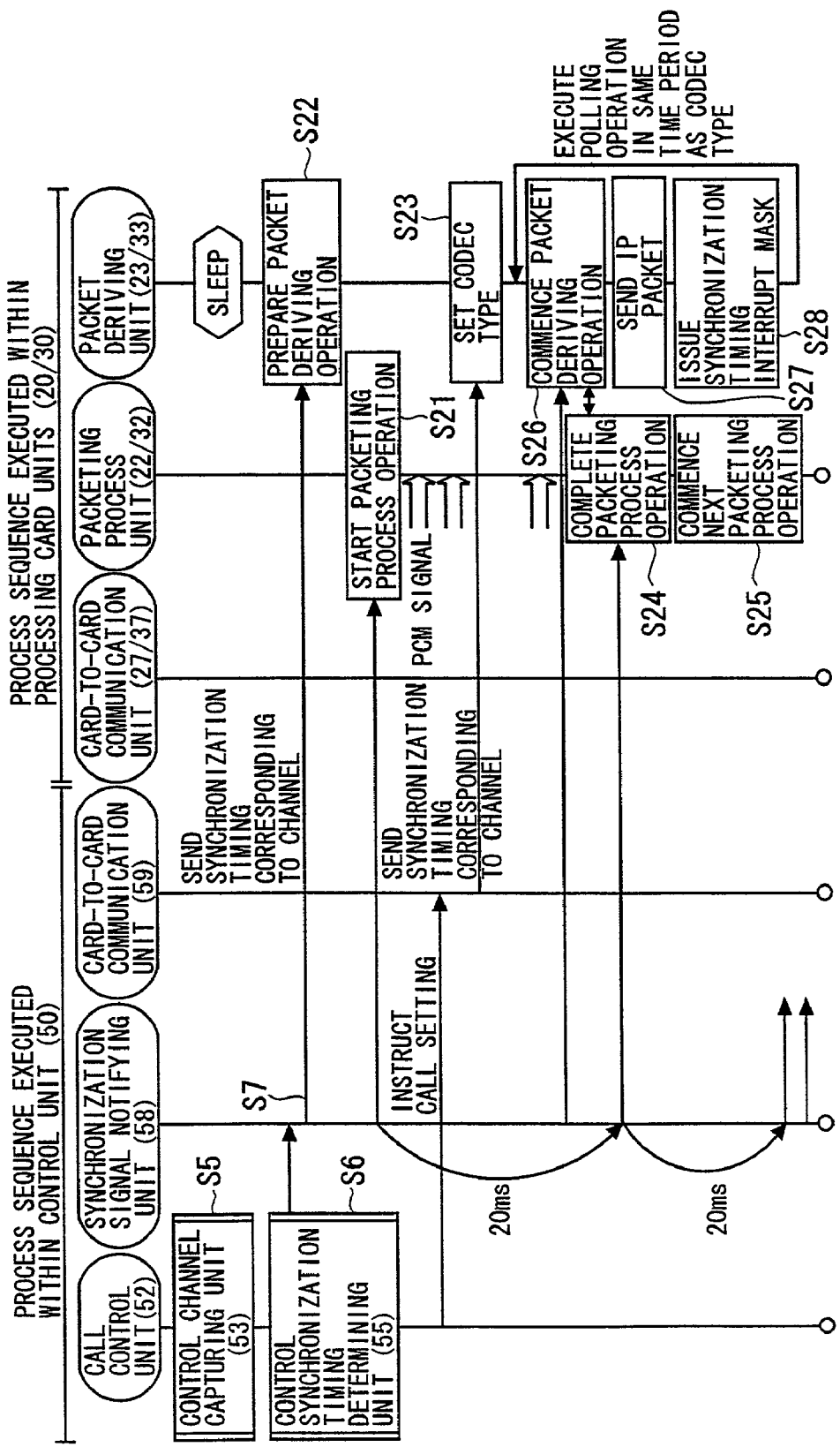
FIG. 13 is a sequential operation diagram for representing a packet deriving control operation.
Figure 14:
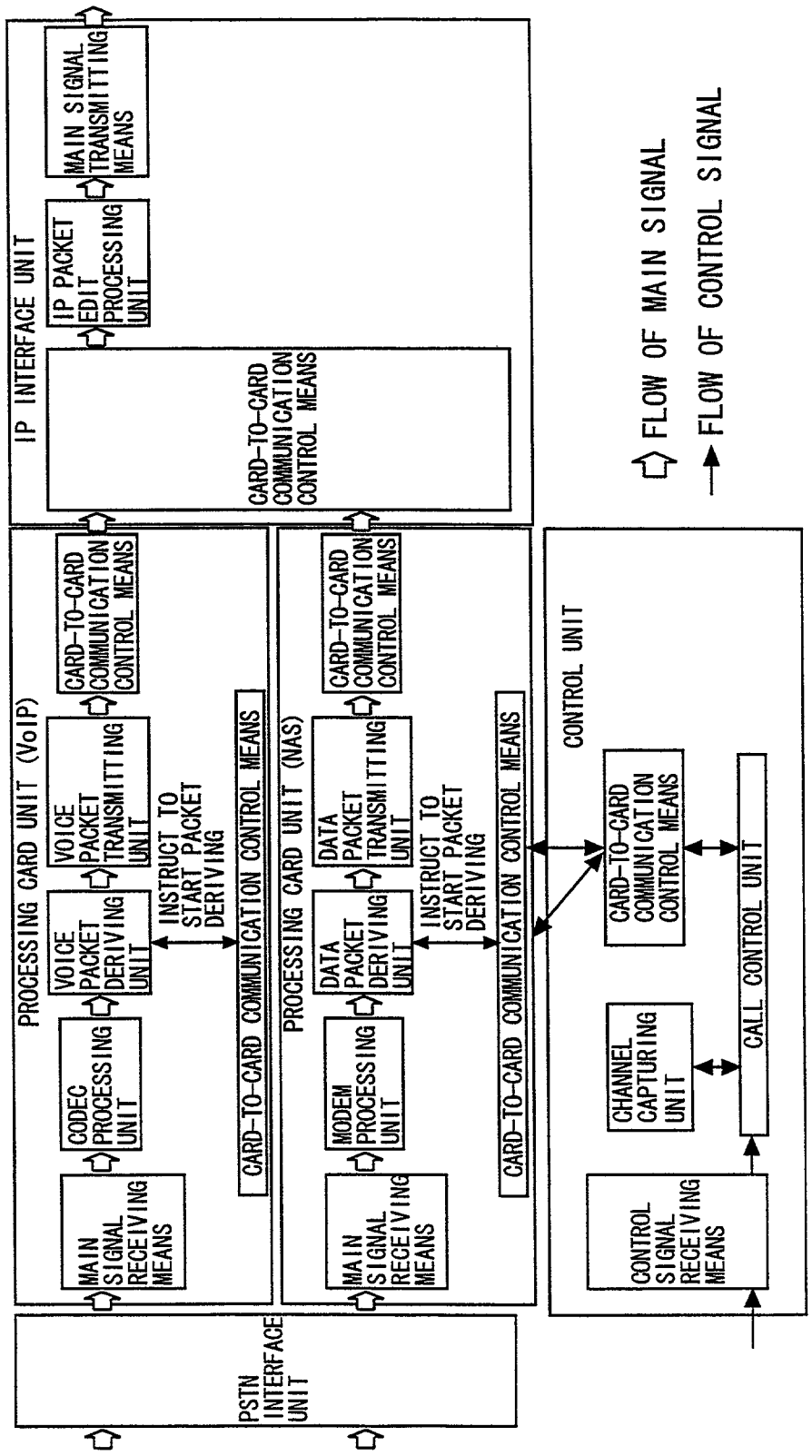
FIG. 14 is a schematic block diagram for indicating the arrangement of the conventional IP gateway apparatus.

In FIG. 13, either the CODEC processing unit 22 of the packeting apparatus 21 or the MODEM processing unit 32 of the packeting apparatus 31 receives a synchronization signal via the synchronization signal notifying unit 58 from the timing generating unit 56 by way of the processing operation executed by the synchronization timing determining unit 55. It should be noted that either the CODEC processing unit 22 or the MODEM processing unit 32 is expressed as "packeting process unit 22/32" hereinafter. As a result, the packeting process unit 22/32 commences a process operation used to packet a PCM signal (S21). On the other hand, when either the voice packet deriving unit 23 or the data packet deriving unit 33 (hereinafter will be expressed as "packet deriving unit 23/33") receives a synchronization signal, the packet deriving unit 23/33 commences a preparing operation for deriving a packet.

Also, the packet deriving unit 23/33 receives a call setting instruction containing both a channel number to be used and a CODEC type from the call control unit 52 via the communication units 59, 27, and 37 at substantially the same timing as the synchronization signal. As a result, the packet deriving unit 23/33 sets the CODEC type (time period of packeting process operation) with respect to the packeting process operation 22/32.

Thereafter, when the packeting process unit 22/32 receives a next synchronization signal (initial synchronization timing), this packeting process unit 22/32 accomplishes the packeting process operation (S24), and starts a next packeting process operation (S25) On the other hand, the packet deriving unit 23/33 receives the next synchronization signal (initial synchronization timing) at substantially the same timing as the completion of the packeting process operation, derives a packet (either voice packet or data packet) from the packeting process unit 22/32 (S26), and then supplies the derived packet to either the voice packet transmitting unit 24 or the data packet transmitting unit 34 (S27). As a consequence, an IP packet (either voice packet or data packet) may be transmitted from either the card 20 or the card 30 to the IP interface unit 40.

Thereafter, the packet deriving unit 23/33 sets a synchronization timing interrupt mask, while using the reception of the initial synchronization timing as a chance, so as not to receive a synchronization signal subsequent to the initial synchronization timing (S28). Furthermore, the packet deriving unit 23/33 commences a polling process operation used to derive a packet, and executes the polling process operation at the same time period as the set CODEC type (time period of packeting process operation). As a result, the packet deriving process operation is carried out in a given time period (namely, 20-millisecond time period in an example shown in FIG. 13).

As previously explained, the packeting apparatuses 21 and 31 of the respective cards 20 and 30 perform the IP packeting operation of the PCM signal in accordance with the synchronization timing applied from the synchronization timing generating apparatus 54. As a consequence, the processing time of the packeting operation for the respective channels can be secured, so that the delays occurring in the processing operation defined after the packet is produced until the produced packet is transmitted to the IP network can be suppressed.

<Effects Made by Embodiments>

In accordance with the embodiment of the present invention, the synchronization timing generating apparatus 54 is arranged by the synchronization timing determining unit 55 and the timing generating unit 56 which generates the timing signal based upon the determined value of the synchronization timing determining unit 55. This synchronization timing generating apparatus 54 supplies the synchronization signals (synchronization timing) to the packeting apparatuses 21 and 31 in such a manner that with respect to the respective voice lines (channels) stored in the IP gateway apparatus 100, the time (timing) required for packeting the PCM signals received via the respective channels are not overlapped with each other.

The packeting apparatuses 21 and 31 of the respective cards 20 and 30 correspond to the apparatuses capable of packeting the PCM signals, and perform both the processing operations for deriving either the voice packet or the data packet and the processing operations for transmitting either the voice packet or the data packet based upon the synchronization signals applied from the synchronization timing generating apparatus 54.

As a result, in the stages that the PCM signals are packeted within the IP gateway apparatus 100 and thereafter the voice packet, or the data packet is sent out to the IP network, the delay occurred in the processing time can be suppressed. This delay is caused by congestion of the processing operations required in such a case that packeting requests are issued at the same time from a plurality of channels. As a result, the delay and the fluctuation occurring in the packeting process operations can be solved, so that the voice qualities can be improved.

Also, in accordance with the embodiment of the present invention, the timing generating unit 56 employed in the synchronization timing generating apparatus 54 may generate the variable timing fitted to the CODEC types for every channel by combining the timing signal (synchronization signal) generated by the synchronization signal generating unit 561 under control of the synchronization control unit 563 with the enable signal generated by the enable signal generating unit 562.

As a consequence, the timing signal produced based upon the condition (CODEC type, etc.) of this call may be applied to the respective packeting apparatuses 21 and 31 for every channel. Accordingly, the time required to output the voice packet by the CODEC processing unit 22 of the packeting apparatus 21 can be made equal to the time required to output the data packet by the MODEM processing unit 32 of the packeting apparatus 31, so that the respective processing time can be secured. Therefore, there is no delay in the processing time of packeting the voice signals, so that the voice qualities can be improved.

Furthermore, in accordance with the embodiment of the present invention, the synchronization timing determining unit 55 employed in the synchronization timing generating apparatus 54 is called in the call-by-call manner (for every call) from the call control unit 52, and reads out the information (such as CODEC type, media delay characteristic, call amount for every media) with respect to each of the calls, and also the synchronization timing managing data so as to refer to the read information and synchronization timing managing data. Then, the synchronization timing determining unit 55 determines the synchronization timing value of the corresponding channel, and then sets the determined timing values (offset value, and time period value) to the timing generating data storage unit 566 of the timing generating unit 56.

As a result, the time required to output the voice packet is made equal to the time required to output the data packet, and thus, the process timing of the voice packet is separated from the process timing of the data packet. As a consequence, both the processing time required for the voice packet and the processing time required for the data packet can be secured. Therefore, there is no delay in the processing time required to packet the voice signals, so that the voice qualities can be improved.

Also, according to the embodiment of the present invention, the fragment length managing unit 57 employed in the control unit 50 is called by the call control unit 52 at a time instant when the call setting operation is completed, and manages the fragment length of the data packet based upon both the call amount of the voice packet and the call amount of the data packet at this time. Then, the fragment length managing unit 57 instructs the card 30 via the communication unit 59 to change the fragment length in the case that changing of the fragment length is needed (namely, in such a case that even when fragment length is made long, no adverse influence is given to process operation of voice packet, otherwise, in such a case that adverse influence is given to voice packet processing operation required to process data packet unless fragment length is shortened).

As a consequence, even in the case that the voice is mixed with the data to be received by the IP gateway apparatus 100, the time range of the voice packeting process operation is separated from the time range of the data packeting process operation, so that these processing operations do not interfere to each other. As a result, it is possible to suppress the fluctuation in the transmission of the voice packet, which is caused by the interference of the data packet processing operation (interruption of data packet between voice packets), so that the voice qualities can be improved.

Also, in accordance with the embodiment of the present invention, the packeting apparatuses 21 and 31 employed in the respective cards 20 and 30 correspond to the apparatuses capable of packeting the PCM signals. When the synchronization timing is applied from the synchronization timing generating apparatus 54, these packeting apparatuses 21 and 31 commence the processing operation for packeting the PCM signals, and also the processing operation for deriving either the voice packet or the data packet in synchronism with the applied timing, and then, send out the packet via the communication units 26 and 36 to the IP interface unit 40.

As a result, the transmission interval of the packet from the card 20 to the IP interface unit 40 can be made equal to the transmission interval of the packet from the card 30 to the IP interface unit 40. Therefore, it is possible to suppress the fluctuations in the transmissions of the voice/data packets, which are caused by that the voice packet interfering with the data packet, so that the voice qualities can be improved.

Also, according to the IP gateway apparatus 100 of the embodiment, in the case that either the voice call or the data call is set, the synchronization signal (derive instruction) in correspondence with the time period of the packeting process operation (CODEC process operation) with respect to the channel to be used is applied to the packet deriving unit 23/33. As a consequence, the packet may be derived at substantially the same time when the packeting process operation by the packeting process unit 22/32 is accomplished. As explained above, while the packeting process operation is synchronized with the packet deriving process operation, waste time from when the packet is derived after the packeting process operation is accomplished never occurs.

In accordance with the IP gateway apparatus 100 of the present invention, as to the control operation of the voice packeting process operation in which the PCM signals are converted into the voice packet and then the voice packet is sent out to the IP network, in the case that a plurality of voice lines (channels) are stored, the synchronization timing is applied to the respective lines, and the phase is given to the packet processing time. As a result, the mutual packeting process operations do not interfere with each other. Accordingly, it is possible to suppress the congestion of the process operations in such a case that requests for packeting the PCM signals related to a plurality of lines are issued at substantially same time.

Both the delays contained in the process operations defined by that the PCM signals are packeted in the IP gateway apparatus 100 and then the voice/data packets are sent out to the IP network, and the fluctuation contained in the packets can be suppressed.

As a result, also, as to the voice whose delay time characteristic should be made strict, both the packet discard caused by the delay in the packet arrivals on the reception side, and the fluctuations contained in the arrival time can be suppressed. As a consequence, lowering of the voice qualities such as voice drops, noise, and fluctuations can be avoided when the end user listens to the voice.

What is claimed is:

1. An IP (Internet Protocol) gateway apparatus accommodating a plurality of sound channels, comprising:
   a first unit outputting synchronization signals, the synchronization signals indicating timing for generating packets containing a sound received from each of the plurality of sound channels; and
   a second unit receiving the synchronization signals outputted from said first unit, and respectively generating packets corresponding to each of the plurality of sound channels according to the timing in order to transmit the generated packets to the IP network,
   said second unit including a processing unit for reading encoded data from each of the buffers corresponding to each of the plurality of sound channels, each of the buffers storing encoded data that is obtained by encoding a sound corresponding to each of the plurality of sound channels,
   the timing including read timing for said producing unit reading the encoded data of each of the plurality of sound channels from each of the buffers,
   the read timing synchronizing with an encoding period of each of the plurality of sound channels, and
   the encoding period of each of the plurality of sound channels being determined not to overlap between the sound channels.

2. An IP gateway apparatus according to claim 1, wherein said first unit includes:
   a first signal generator for generating the synchronization signals including a basic synchronization signal, each of the synchronization signals having predetermined phase differences as compared with a phase of the basic synchronization signal;
   a second signal generator for generating plural sorts of enable signals, the enable signals enabling the synchronization signals generated by said first signal generator according to the read timing set to each channel; and
   a controller for giving said second unit the synchronization signals indicating the read timing obtained by combining the synchronization signals with the enable signals determined so that the read timing that does not overlapped between the channels is provided.

3. An IP gateway apparatus according to claim 2, wherein said first unit further includes a unit for giving data for which said controller gives the synchronization signals indicating the timing to said second unit, to said controller.

4. An IP gateway apparatus according to claim 2, further comprising a third unit generating the packets containing data received from a data channel according to the synchronization signal outputted from said first unit, and
   wherein said first unit further includes a unit for giving data for which said controller gives the synchronization signals to said second and third unit so timing for generating packets between sound and data does not overlap, to said controller.

5. An IP gateway apparatus according to claim 1 wherein said second unit includes:
   unit for generating packets containing the sound received from each of the sound channels;
   a unit for producing the generated packets on the basis of the read timing; and
   a unit for transmitting the produced packets to the IP network.

6. An IP (Internet Protocol) gateway apparatus accommodating a plurality of channels including at least first and second channels, comprising:
   first means for outputting synchronization signals, the synchronization signals indicating first timing for generating packets containing a sound received from the first channel and second timing for generating packets comprising sound received from the second channel; and
   second means for receiving the synchronization signals outputted from said first means, and respectively generating the packets corresponding to the fast and second channels according to the first and second timing in order to transmit the generated packets to the IP network;
   third means generating the packets containing data received from a third channel according to the synchronization signal indicating a third timing outputted from said first means; and
   means for giving a change instruction to said third means on the basis of a use condition of the first and second channel, and
   wherein said third means, when receives the change instruction, changes a length of a fragment of the data to be stored in a packet, and
   wherein said first means includes:
   a first signal generator for generating the synchronization signals including a basic synchronization signal, each of the synchronization signals having predetermined phase differences as compared with a phase of the basic synchronization signal;
   a second signal generator for generating plural sorts of enable signals, the enable signals enabling the synchronization signals generated by said first signal generator according to the first and second timing set to each of the first and second channels; and
   a controller for giving said second means the synchronization signals indicating the first and second timing obtained by combining the synchronization signals with the enable signals determined so that the first and second dining are not overlapped with each other; and
   means for giving data for which said controller gives the synchronization signals indicating the first, second and third timing to said second and third means so that the first, second and third timing are not overlapped with each other, to said controller.

* * * * *

UNITED STATES PATENT AND TRADEMARK OFFICE
CERTIFICATE OF CORRECTION

PATENT NO. : 6,961,331 B2  Page 1 of 1
APPLICATION NO. : 09/799546
DATED : November 1, 2005
INVENTOR(S) : Seiji Tokunaga It is certified that error appears in the above-identified patent and that said Letters Patent is hereby corrected as shown below:

Claim 6 column 24, line 20: "-fast-" should be changed to -- --first-- --.
Claim 6 column 24, line 49: "-dining-" should be changed to -- --timing-- --.

Signed and Sealed this

Thirteenth Day of March, 2007

JON W. DUDAS
*Director of the United States Patent and Trademark Office*